(12) United States Patent
Park et al.

(10) Patent No.: US 8,285,325 B2
(45) Date of Patent: *Oct. 9, 2012

(54) METHOD AND APPARATUS FOR INTERFACING AMONG MOBILE TERMINAL, BASE STATION AND CORE NETWORK IN MOBILE TELECOMMUNICATIONS SYSTEM

(75) Inventors: Jae-Hong Park, Ichon-shi (KR);
Woon-Hee Hwang, Ichon-shi (KR);
Yeon-Sang Koo, Ichon-shi (KR);
Chong-Won Lee, Ichon-shi (KR);
Shin-Hyun Yang, Ichon-shi (KR);
Jeong-Hwa Ye, Ichon-shi (KR)

(73) Assignee: Pantech Co., Ltd., Seoul (KR)

( * ) Notice: Subject to any disclaimer, the term of this patent is extended or adjusted under 35 U.S.C. 154(b) by 1127 days.

This patent is subject to a terminal disclaimer.

(21) Appl. No.: 11/966,263

(22) Filed: Dec. 28, 2007

(65) Prior Publication Data

US 2008/0318570 A1 Dec. 25, 2008

Related U.S. Application Data

(63) Continuation of application No. 10/825,281, filed on Apr. 15, 2004, now Pat. No. 7,505,783, which is a continuation of application No. 09/564,941, filed on May 4, 2000, now Pat. No. 6,741,868.

(30) Foreign Application Priority Data

Jul. 30, 1999 (KR) .................................. 1999-31448
Jul. 31, 1999 (KR) .................................. 1999-31591
Aug. 19, 1999 (KR) .................................. 1999-34344

(51) Int. Cl.
*H04M 1/00* (2006.01)

(52) U.S. Cl. .................... 455/552.1; 455/435.2; 370/466

(58) Field of Classification Search .................. 455/502,
455/552.1, 553.1, 432.1, 435.1, 445, 453,
455/561, 424, 435.2, 511; 370/230, 231,
370/335, 338, 442, 465, 466
See application file for complete search history.

(56) References Cited

U.S. PATENT DOCUMENTS 5,729,544 A 3/1998 Lev et al.
(Continued)

FOREIGN PATENT DOCUMENTS

EP 0841831 5/1998
(Continued)

OTHER PUBLICATIONS

Non-Final Office Action dated Jan. 8, 2009 (from co-pending U.S. Appl. No. 11/457,940).
(Continued)

*Primary Examiner* — Temica M Beamer
(74) *Attorney, Agent, or Firm* — H. C. Park & Associates, PLC

(57) ABSTRACT

A method, apparatus and a computer readable record media storing instructions for executing the same method for interfacing among a hybrid type synchronous or asynchronous terminal to a core network in a next generation mobile telecommunications system. The hybrid type synchronous or asynchronous radio network determines the operating type of the core network when the core network has a connection thereto, and sends the determined core network operating type information and information related to the core network to the hybrid type synchronous or asynchronous terminal, thereby allowing the synchronous or asynchronous terminal to smoothly perform a data interfacing operation with the core network.

13 Claims, 24 Drawing Sheets

U.S. PATENT DOCUMENTS

| | | | |
|---|---|---|---|
| 5,862,481 A * | 1/1999 | Kulkarni et al. | 455/432.2 |
| 5,896,376 A | 4/1999 | Alperovich et al. | |
| 5,946,634 A | 8/1999 | Korpela | |
| 6,052,386 A | 4/2000 | Achilleoudis et al. | |
| 6,137,806 A | 10/2000 | Martinez | |
| 6,295,457 B1 | 9/2001 | Narayanaswamy | |
| 6,347,091 B1 | 2/2002 | Wallentin et al. | |
| 6,374,109 B1 | 4/2002 | Shaheen et al. | |
| 6,374,112 B1 | 4/2002 | Widegren et al. | |
| 6,389,008 B1 | 5/2002 | Lupien et al. | |
| 6,397,065 B1 | 5/2002 | Huusko et al. | |
| 6,490,451 B1 | 12/2002 | Denman et al. | |
| 6,505,044 B1 | 1/2003 | Back et al. | |
| 6,542,516 B1 | 4/2003 | Vialen et al. | |
| 6,567,667 B1 | 5/2003 | Gupta et al. | |
| 6,584,314 B1 | 6/2003 | Haumont et al. | |
| 6,594,238 B1 | 7/2003 | Wallentin et al. | |
| 6,594,242 B1 | 7/2003 | Kransmo | |
| 6,741,868 B1 | 5/2004 | Park et al. | |
| 6,782,274 B1 | 8/2004 | Park et al. | |
| 6,801,786 B1 | 10/2004 | Korpela | |
| 6,876,634 B1 | 4/2005 | Lim | |
| 6,950,419 B1 | 9/2005 | Park et al. | |
| 7,110,788 B2 | 9/2006 | Park et al. | |
| 7,203,514 B2 | 4/2007 | Park et al. | |
| 2002/0193139 A1 | 12/2002 | Mildh et al. | |

FOREIGN PATENT DOCUMENTS

| | | |
|---|---|---|
| EP | 0852448 | 7/1998 |
| GB | 2283154 | 4/1995 |
| GB | 2320653 | 6/1998 |
| JP | 2000-513901 | 10/2000 |
| JP | 2002-513520 | 5/2002 |
| KR | 10-1997-0056462 | 7/1997 |
| KR | 10-1999-0043774 | 6/1999 |
| WO | 98-09455 | 3/1998 |
| WO | 98-45894 | 10/1998 |
| WO | 99-66742 | 12/1999 |
| WO | 00-60885 | 10/2000 |
| WO | 00/60895 | 10/2000 |

OTHER PUBLICATIONS

U.S. Office Action dated Mar. 10, 2005 (from co-pending U.S. Appl. No. 10/824,929).
U.S. Office Action dated Dec. 8, 2005 (from co-pending U.S. Appl. No. 10/824,929).
Notice of Allowance dated Jun. 1, 2006 (from co-pending U.S. Appl. No. 10/824,929).
U.S. Office Action dated Sep. 5, 2006 (from co-pending U.S. Appl. No. 10/824,891).
U.S. Office Action dated Feb. 20, 2007 (from co-pending U.S. Appl. No. 10/824,891).
U.S. Office Action dated Aug. 29, 2007 (from co-pending U.S. Appl. No. 10/824,891).
U.S. Office Action dated Mar. 11, 2005 (from co-pending U.S. Appl. No. 10/825,281).
U.S. Office Action dated Oct. 13, 2005 (from co-pending U.S. Appl. No. 10/825,281).
U.S. Office Action dated Apr. 5, 2006 (from co-pending U.S. Appl. No. 10/825,281).
U.S. Office Action dated Mar. 22, 2007 (from co-pending U.S. Appl. No. 10/825,281).
Notice of Allowance dated Sep. 11, 2007 (from co-pending U.S. Appl. No. 10/825,281).
U.S. Office Action dated Mar. 10, 2005 (from co-pending U.S. Appl. No. 10/824,908).
U.S. Office Action dated Dec. 8, 2005 (from co-pending U.S. Appl. No. 10/824,908).
U.S. Office Action dated Nov. 21, 2006 (from co-pending U.S. Appl. No. 10/824,908).
U.S. Office Action dated Jul. 24, 2007 (from co-pending U.S. Appl. No. 10/824,908).
U.S. Office Action dated Nov. 23, 2004 (from co-pending U.S. Appl. No. 10/825,280).
U.S. Office Action dated May 6, 2005 (from co-pending U.S. Appl. No. 10/825,280).
U.S. Office Action dated Jan. 11, 2006 (from co-pending U.S. Appl. No. 10/825,280).
Notice of Allowance dated Jul. 11, 2006 (from co-pending U.S. Appl. No. 10/825,280).
Peterson et al., "Third Generation Personal Communications Physical Layer: Staus and Open Issues", Information Theory and Communications Workshop, 1999. Proceedings of the 1999 IEEE, Jun. 1999, p. 39.
TS 25.331, "3rd Generation Partnership Project (3GPP), Technical Specification Group"(TSG (RAN), Working Group 2 (WG2), RRC Protocol Specification, V3.0.0 (Oct. 1999), pp. 24-40, 148-163.
U.S. Office Action dated Nov. 29, 2007 (from co-pending U.S. Appl. No. 10/824,909).
U.S. Office Action dated Jan. 29, 2008 (from co-pending U.S. Appl. No. 10/824,927).
U.S. Office Action dated Feb. 6, 2008 (from co-pending U.S. Appl. No. 10/824,928).
U.S. Office Action dated Apr. 28, 2008 (from co-pending U.S. Appl. No. 11/227,684).
U.S. Office Action dated Nov. 7, 2008 (from co-pending U.S. Appl. No. 10/824,909).
U.S. Office Action dated Feb. 8, 2008 (from co-pending U.S. Appl. No. 11/620,425).
U.S. Office Action dated Aug. 8, 2008 (from co-pending U.S. Appl. No. 11/620,425).
U.S. Office Action dated Feb. 24, 2009 (from co-pending U.S. Appl. No. 11/620,425).
Berruto et al., "Research Activities on UMTS Radio Interface, Network Architecture & Planning", Communications Magazine, IEEE, Feb. 1998, vol. 36, Issue 2. pp. 82-95.

* cited by examiner

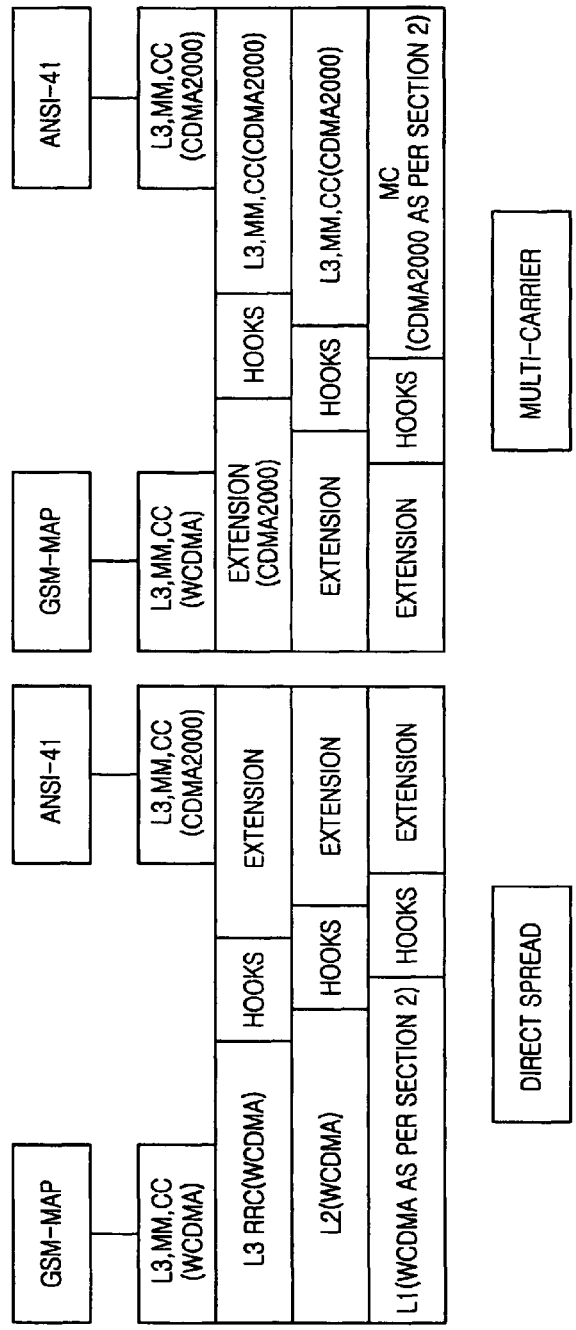

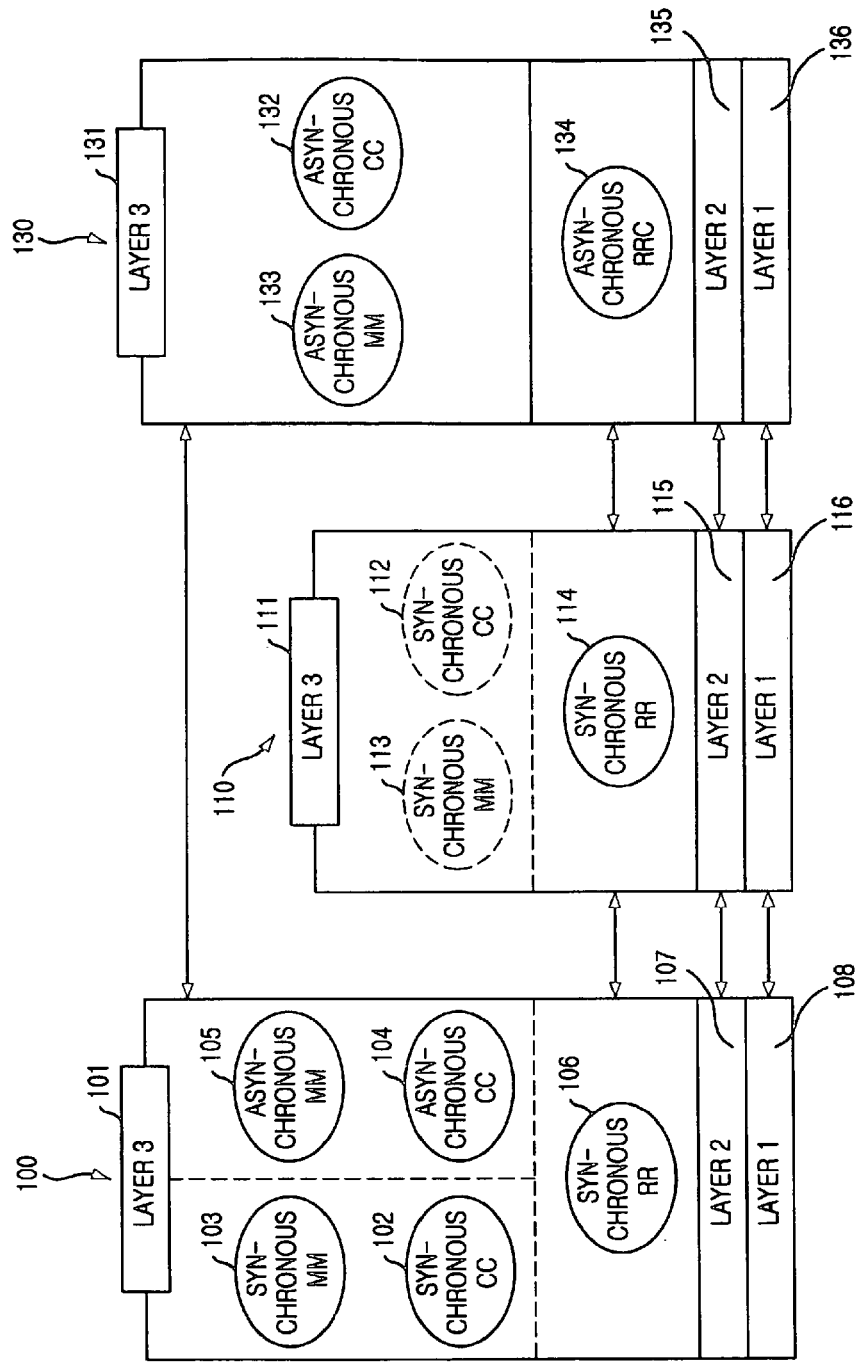

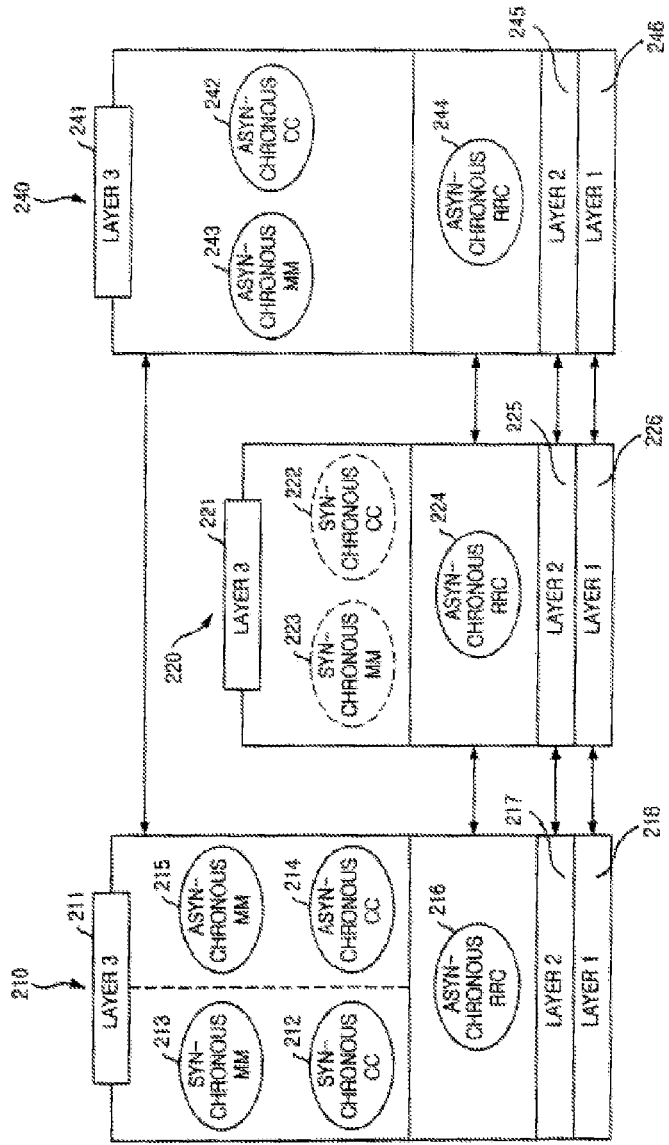

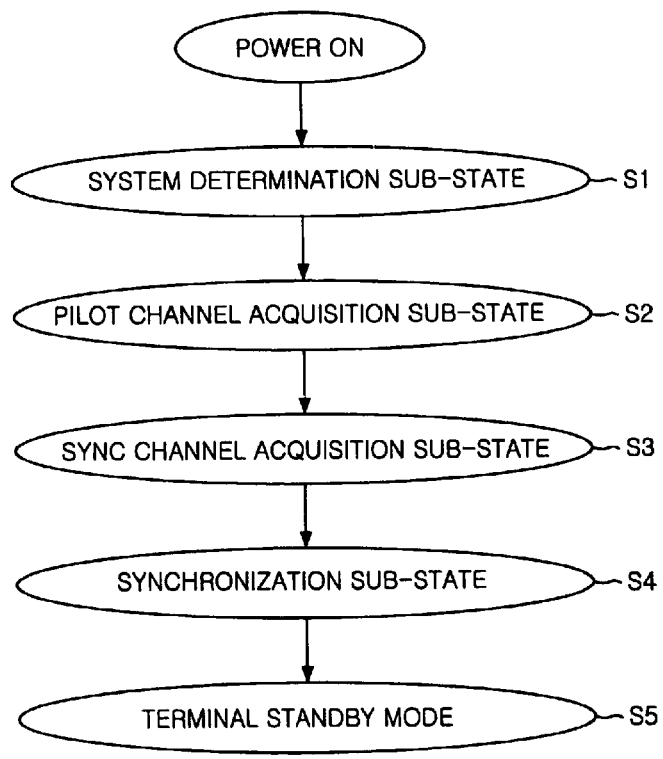

FIG. 7A
(PRIOR ART)

| |
|---|
| PROTOCOL REVISION LEVEL (8 BITS) |
| MINIMUM PROTOCOL REVISION LEVEL (8 BITS) |
| SYSTEM IDENTIFICATION (15 BITS) |
| NETWORK IDENTIFICATION (16 BITS) |
| PILOT PN SEQUENCE OFFSET INDEX (9 BITS) |
| LONG CODE STATE (42 BITS) |
| SYSTEM TIME (36 BITS) |
| THE NUMBER OF LEAP SECONDS THAT HAVE OCCURRED SINCE THE START OF SYSTEM TIME (8 BITS) |
| OFFSET OF LOCAL TIME FROM SYSTEM TIME (6 BITS) |
| DAYLIGHT SAVINGS TIME INDICATOR (1 BIT) |
| PAGING CHANNEL DATA RATE (2 BITS) |
| FREQUENCY ASSIGNMENT (11 BITS) |
| EXTENDED FREQUENCY ASSIGNMENT (11 BITS) |
| ORTHOGONAL TRANSMIT DIVERSITY MODE (2 BITS) |

FIG. 7B
(PRIOR ART)

| INFORMATION ELEMENT CATEGORY | INFORMATION ELEMENTS | REFER-ENCE | TYPE | NOTE |
|---|---|---|---|---|
| | MESSAGE TYPE | | M | |
| | | | | |
| CN INFORMATION ELEMENTS | | | | |
| | PLMN IDENTITY | | M | |
| | CN DOMAIN IDENTITY | | M | FOR EACH CORE NETWORK DOMAIN. |
| | NAS SYSTEM INFORMATION | | M | INFORMATION MUST BE INCLUDED FOR AT LEAST ONE CORE NETWORK DOMAIN TYPE. |
| | | | | |
| UTRAN MOBILITY INFORMATION ELEMENTS | URA IDENTITY | | M | FOR EACH URA |
| | INFORMATION FOR PERIDOIC CELL AND URA UPDATE | | M | NOTE : NOT FOR EACH URA ANY MORE |
| | CELL IDENTITY | | M | THE NECESSITY AND USAGE OF CELL IDENTITY IS FFS. |
| | CELL SELECTION AND RE-SELECTION INFO | | M | |
| | | | | |
| ⋮ | ⋮ | ⋮ | ⋮ | ⋮ |

FIG. 9B

| NETWORK DETERMINATOR(1 BIT) |
|---|
| PROTOCOL REVISION LEVEL (8 BITS) |
| MINIMUM PROTOCOL REVISION LEVEL (8 BITS) |
| SYSTEM IDENTIFICATION (15 BITS) |
| NETWORK IDENTIFICATION (16 BITS) |
| PILOT PN SEQUENCE OFFSET INDEX (9 BITS) |
| LONG CODE STATE (42 BITS) |
| SYSTEM TIME (36 BITS) |
| THE NUMBER OF LEAP SECONDS THAT HAVE OCCURRED SINCE THE START OF SYSTEM TIME (8 BITS) |
| OFFSET OF LOCAL TIME FROM SYSTEM TIME (6 BITS) |
| DAYLIGHT SAVINGS TIME INDICATOR (1 BIT) |
| PAGING CHANNEL DATA RATE (2 BITS) |
| FREQUENCY ASSIGNMENT (11 BITS) |
| EXTENDED FREQUENCY ASSIGNMENT (11 BITS) |
| ORTHOGONAL TRANSMIT DIVERSITY MODE (2 BITS) |

Rows 2–5 (PROTOCOL REVISION LEVEL through NETWORK IDENTIFICATION): CN TYPE="1"

FIG. 10A

| INFORMATION ELEMENT | PRESENCE | MULTI | IE TYPE AND REFERENCE | SEMANTICS DESCRIPTION |
|---|---|---|---|---|
| OTHER INFORMATION ELEMENTS | | | | |
| MIB VALUE TAG | M | | | |
| CHOICE MODE | | | | |
| >TDD | | | | |
| >>SFNPRIME | M | | INTEGER (0,2..4094) | SFN=SFNPRIME(FOR FRIST 10ms FRAME OF 20ms TTI), SFN=SFNPRIME+1(FOR LAST 10ms FRAME OF 20ms TTI), |
| NETWORK CAPABILITY EXTENSION INDICATION | | | | A VALUE OF "FALSE" INDICATES THAT THE INITIAL UE CAPABILITY IS INTERPRETED ACCORDING TO "RELEASE 99(FIRST RELEASE)". IF THE VALUE IS SET TO "TRUE", A NEW DEFINITION GIVEN IN A FUTURE RELEASE IS ADDED TO THIS INFORMATION ELEMENT. |
| CAPABILITY EXTENSION INFO | C-IND | | | NOTE 1 |
| REFERENCES TO OTHER SYSTEM INFORMATION BLOCKS | | 1.. <MAX SYS INFO BLOCK COUNT> | | |
| >SCHEDULING INFORMATION | M | | | |
| CN INFORMATION ELEMENTS | | | | |
| CN TYPE | M | | GSM-MAP | |
| PLMN IDENTITY | C-GSM | | | |

FIG. 10B

| CONDITION | EXPLANATION |
|---|---|
| GSM | THIS INFORMATION ELEMENT SHALL BE PRESENT IN CASE(CN TYPE == "GSM-MAP") OR (CN TYPE == "GSM-MAP AND ANSI-41") |
| ANSI | THIS INFORMATION ELEMENT SHALL BE PRESENT IN CASE(CN TYPE == "ANSI-41") OR (CN TYPE == "GSM-MAP AND ANSI-41") |
| | |

FIG. 10C

| INFORMATION ELEMENT | PRESENCE | MULTI | IE TYPE AND REFERENCE | SEMANTICS DESCRIPTION |
|---|---|---|---|---|
| OTHER INFORMATION ELEMENTS | | | | |
| MIB VALUE TAG | M | | | |
| CHOICE MODE | | | | |
| >TDD | | | | |
| >>SFNPRIME | M | | INTEGER (0,2..4094) | SFN=SFNPRIME(FOR FRIST 10ms FRAME OF 20ms TTI), SFN=SFNPRIME+1 (FOR LAST 10ms FRAME OF 20ms TTI), |
| NETWORK CAPABILITY EXTENSION INDICATION | | | | A VALUE OF "FALSE" INDICATES THAT THE INITIAL UE CAPABILITY IS INTERPRETED ACCORDING TO "RELEASE 99(FIRST RELEASE)". IF THE VALUE IS SET TO "TRUE", A NEW DEFINITION GIVEN IN A FUTURE RELEASE IS ADDED TO THIS INFORMATION ELEMENT. |
| CAPABILITY EXTENSION INFO | C-IND | | | NOTE 1 |
| REFERENCES TO OTHER SYSTEM INFORMATION BLOCKS | | 1..<MAX SYS INFO BLOCK COUNT> | | |
| >SCHEDULING INFORMATION | M | | | |
| CN INFORMATION ELEMENTS | | | | |
| CN TYPE | M | | ANSI-41 | |
| | | | | |
| ANSI-41 INFORMATION ELEMENTS | C-ANSI | | | |
| >P_PEV | M | | | |
| >MIN_P_REV | M | | | |
| >SID | M | | | |
| >NID | M | | | |

FIG. 10D

| CONDITION | EXPLANATION |
|---|---|
| GSM | THIS INFORMATION ELEMENT SHALL BE PRESENT IN CASE(CN TYPE == "GSM-MAP") OR (CN TYPE == "GSM-MAP AND ANSI-41") |
| ANSI | THIS INFORMATION ELEMENT SHALL BE PRESENT IN CASE(CN TYPE == "ANSI-41") OR (CN TYPE == "GSM-MAP AND ANSI-41") |
|  |  |

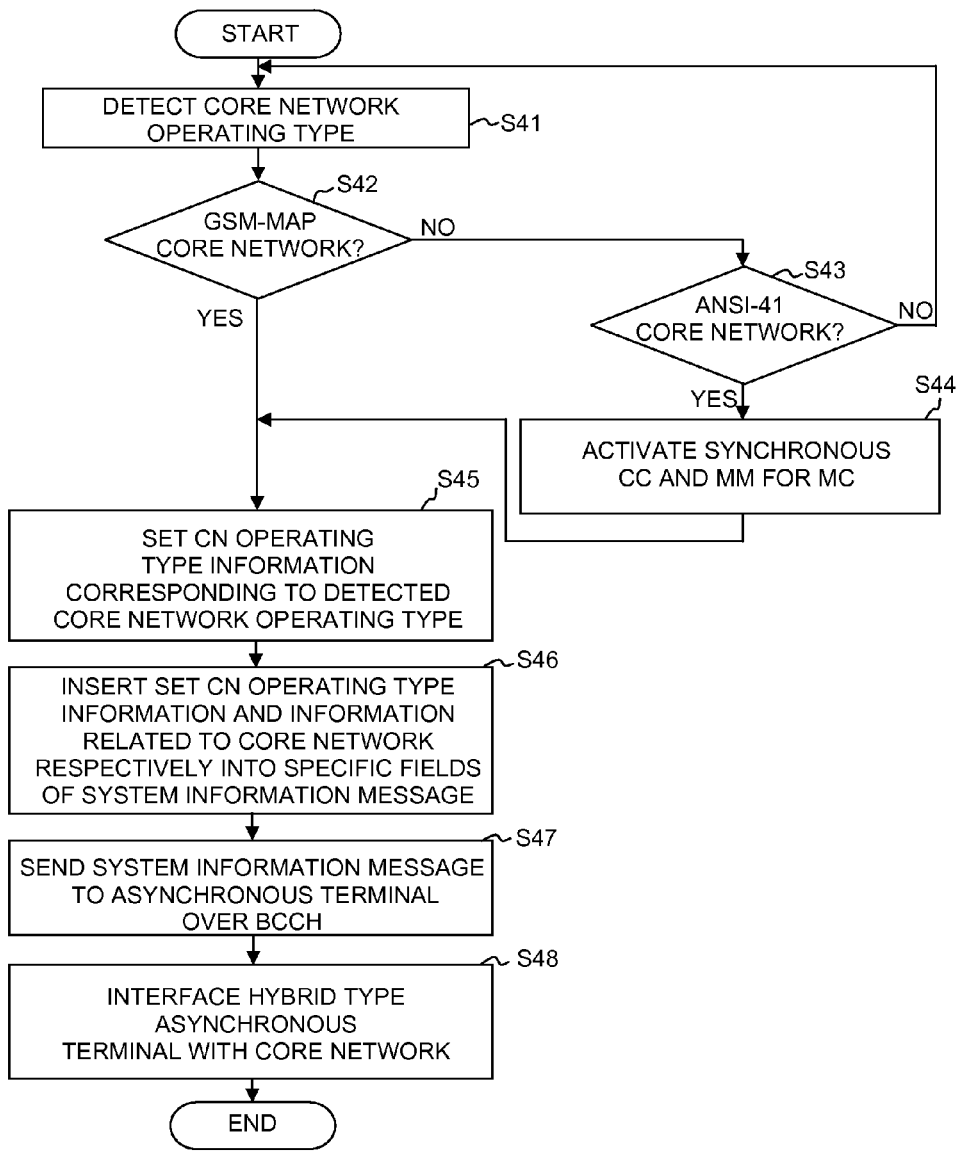

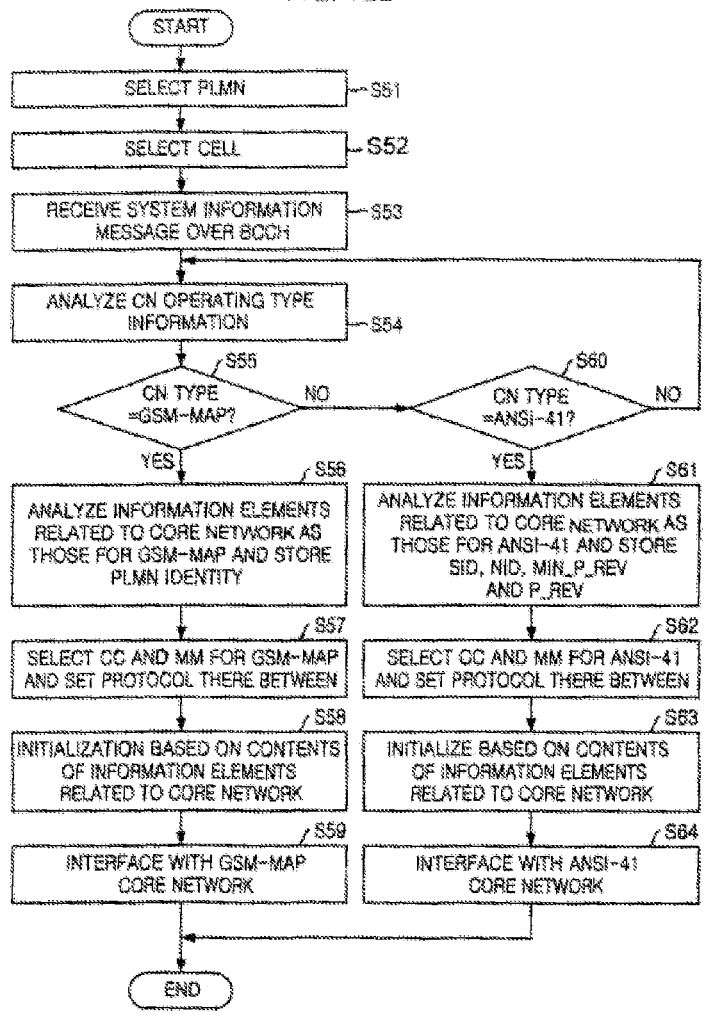

METHOD AND APPARATUS FOR INTERFACING AMONG MOBILE TERMINAL, BASE STATION AND CORE NETWORK IN MOBILE TELECOMMUNICATIONS SYSTEM

CROSS REFERENCE TO RELATED APPLICATIONS

This application is a continuation application of application Ser. No. 10/825,281, filed on Apr. 15, 2004, which is a continuation of application Ser. No. 09/564,941, filed on May 4, 2000, now issued as U.S. Pat. No. 6,741,868, both of which claim priority to and the benefit of Korean Patent Application No. 1999-31448, filed on Jul. 30, 1999, Korean Patent Application No. 1999-31591, filed on Jul. 31, 1999, and Korean Patent Application No. 1999-34344, filed on Aug. 19, 1999, which are all hereby incorporated by reference for all purposes as if fully set forth herein.

FIELD OF THE INVENTION

The present invention relates in general to a technique for interfacing among a mobile terminal, a base station (BS) and a core network in a next-generation mobile telecommunications system, and more particularly to a method, an apparatus and a computer readable record media storing instructions for executing the same method for interfacing among a hybrid type mobile terminal, a hybrid type base transceiver station/base station controller (BTS/BSC) and a core network in a next-generation telecommunication system, e.g., an international mobile telecommunications-2000 (IMT-2000) system and so on, in which a hybrid type synchronous or hybrid type asynchronous radio network determines an operating type of the core network when the core network has a connection thereto, and sends information about the determined core network operating type and information related to the core network to a hybrid type mobile terminal.

In more detail, the present invention relates to a method, an apparatus and a computer readable record media storing instructions for executing the same method for interfacing among a hybrid type mobile terminal, a hybrid type base transceiver station/base station controller (BTS/BSC) and a core network in a mobile telecommunications system, wherein a hybrid type synchronous radio network having a hybrid type BTS/BSC determines the operating type of the core network when the core network has a connection thereto, and sends the determined core network operating type and information related to the core network to the hybrid type synchronous terminal over a synchronous channel (Sync channel), and the hybrid type synchronous terminal recognizes the operating type of the core network on the basis of the core network operating type information (hereinafter, refers to "CN type") and sets a protocol according to the information related to core network.

Further, the present invention relates to a method, an apparatus and a computer readable record media for executing the same method for interfacing an asynchronous terminal and a hybrid type asynchronous BTS/BSC with a core network in a mobile telecommunications system, wherein a hybrid type asynchronous radio network having a hybrid type asynchronous BTS/BSC determines an operating type of the core network when the core network has a connection thereto, and sends the determined core network operating type information and information related to the core network to a hybrid type asynchronous terminal over a broadcast control channel (BCCH), and the hybrid type asynchronous terminal recognizes the core network on the basis of the core network operating type information and sets a protocol according to the information related to the core network.

DESCRIPTION OF THE PRIOR ART

In a conventional synchronous mobile telecommunications system, a synchronous terminal is connected to a synchronous radio network (for example, a CDMA-2000 radio network), and an ANSI-41 network is connected to a core network.

In a conventional asynchronous mobile telecommunications system, an asynchronous terminal is connected to an asynchronous radio network (for example, a universal mobile telecommunication system (UMTS) terrestrial radio access network (UTRAN)), and a global system for mobile communications-mobile application part (GSM-MAP) network is connected to a core network.

FIG. 1A and FIG. 1B show core network interface architectures of the conventional synchronous/asynchronous mobile telecommunication systems as mentioned above.

FIG. 1A is a view showing the core network interface architecture of the conventional synchronous mobile telecommunications system. In this drawing, the reference numeral 11 denotes a synchronous terminal, 12 denotes a synchronous radio network (i.e., a code division multiple access-2000 (CDMA-2000) radio network) which performs a data interfacing operation with the synchronous terminal 11 and includes a synchronous base transceiver station/base station controller (BTS/BSC), and 13 denotes a synchronous core network which is connected to the synchronous radio network 12 and includes a synchronous mobile services switching center (MSC) 14 and an ANSI-41 network 15.

In the above core network interface architecture of the conventional synchronous mobile telecommunications system, the synchronous terminal 11 can be connected to only the synchronous radio network 12 as well known to one skilled in the art, which is in turn connected to the synchronous core network 13, thereby allowing the synchronous terminal 11 to be interfaced with only the synchronous core network 13.

FIG. 1B is a view showing the core network interface architecture of the conventional asynchronous mobile telecommunications system. In this drawing, the reference numeral 21 denotes an asynchronous terminal, 22 denotes an asynchronous radio network (i.e., a UTRAN) which includes a base transceiver station (BTS) and a radio network controller (RNC), and 23 denotes an asynchronous core network which includes an asynchronous mobile services switching center (MSC) 24 connected to the UTRAN 22 and a GSM-MAP network 25 connected to the asynchronous MSC 24.

In the above core network interface architecture of the conventional asynchronous mobile telecommunications system, the asynchronous terminal 21 is connected to the asynchronous radio network 22 (i.e., UTRAN) which is in turn connected to the asynchronous core network 23, thereby allowing the asynchronous terminal 21 to perform a data interfacing operation with the asynchronous core network 23.

FIG. 2A and FIG. 2B show layered protocol structures of the conventional synchronous/asynchronous mobile telecommunication systems as mentioned above.

FIG. 2A is a view showing the layered protocol structure of the conventional synchronous mobile telecommunications system. In this drawing, the reference numeral 30 denotes a synchronous terminal, 40 a synchronous radio network, and 50 a synchronous core network connected to the synchronous radio network 40.

The synchronous terminal 30 comprises a layer 3 31, a layer 2 35 and a layer 1 36. The layer 3 31 includes a synchronous call control (CC) entity 32 for management of a call and a synchronous mobility management (MM) entity 33 for management of a mobility.

The layer 1 36 is a physical layer which offers data transport services to higher layers and transfers transport blocks over a radio interface.

The layer 2 35 is a data link layer which includes following sub layers, a medium access control (MAC) sub layer and a radio link control (RLC) sub layer. However, the sub layers are not shown in this drawing.

The MAC sub layer offers data transfer services on logical channels to a higher layer (RLC sub layer) and on transport channels to a lower layer (the physical layer 36). The MAC sub layer is responsible for mapping of the logical channel onto the appropriate transports channel.

The RLC sub layer offers data transfer services on primitive to a higher layer and on logical channels to a lower layer (MAC sub layer). Also, the RLC sub layer performs error correction, duplicate detection, ciphering and flow control of the data.

The layer 3 31 is a network layer which includes following sub layers, a synchronous radio resource (RR) sub layer, a synchronous call control (CC) entity 32 and a mobility management (MM) entity 33. In synchronous system, the synchronous RR sub layer is not apparently separated from the others in the layer 3 31.

The RR sub layer offers data transfer services on primitive to a lower layer (RLC sub layer) and handles a control plane signaling of the layer 3 31 between a user equipment (UE) and a synchronous radio network. The RR sub layer manages a radio resource. Also, the RR sub layer assigns/re-configures/releases the radio resource to UE/UTRAN.

The CC entity handles a call control signaling of layer 3 between the UEs and the synchronous radio network.

The MM entity handles a mobility management signaling of layer 3 between the UEs and the synchronous radio network.

The layers 3 to 1 31, 35, and 36 in the synchronous terminal 30 communicate with corresponding layers 41, 45, and 46 in the synchronous radio network 40. The synchronous radio network 40 comprises a layer 3 41, a layer 2 45 and a layer 1 46. The layers 3 to 1 in the synchronous radio network 40 correspond respectively to those in the synchronous terminal 30.

The layers 3 to 1 41, 45, and 46 in the synchronous radio network 40 communicate with corresponding layers 31, 35, 36, 51, 55, and 56 in the synchronous terminal and the synchronous core network 50.

The synchronous core network 50 comprises a layer 3 51, a layer 2 55 and a layer 1 56. The layers 3 to 1 in the synchronous radio network 50 correspond respectively to those in the synchronous terminal 30.

The layers 3 to 1 51, 55, and 56 in the synchronous core network 50 communicate with corresponding layers 41, 45, and 46 in the synchronous radio network 40.

In the conventional synchronous terminal and radio network as the layered protocol structure, the synchronous terminal 30 receives a Sync channel message from the synchronous radio network 40 over a Sync channel and acquires information necessary to its connection to the synchronous core network 50, including information related to the synchronous core network 50 and information about the synchronous radio network 40, from the received Sync channel message.

In other words, for interfacing with the synchronous ANSI-41 network via the synchronous radio network, the synchronous terminal acquires system information (i.e., information related to the radio network and core network) through a system determination sub-state, a pilot channel acquisition sub-state, a Sync channel acquisition sub-state and a timing changing sub-state after it is powered on.

FIG. 6 is a flowchart illustrating a procedure where the synchronous terminal acquires the system information through the four station transitions as mentioned above.

The first state, or the system determination sub-state, S1, is a state where the synchronous terminal selects a code division multiple access (CDMA) system with which it should communicate. Before being powered off, the synchronous terminal stores a CDMA channel number that it uses at the present time, a CDMA area list, a system identification (SID) list, a network identification (NID) list and other information in its memory. Thereafter, upon being powered on, the synchronous terminal selects a CDMA system with which it can communicate on the basis of the above information stored in its memory and a CDMA system selection algorithm, which is provided from a terminal manufacturer. After selecting the CDMA system, the synchronous terminal shifts to the next state, or the pilot channel acquisition sub-state, S2 to acquire a pilot.

The pilot channel acquisition sub-state S2 is a state where the synchronous terminal obtains a pilot channel and thus selects a base transceiver station. After selecting the CDMA system, the synchronous terminal acquires a pilot with the same CDMA channel number, or CDMA frequency number, as that corresponding to the selected CDMA system. After acquiring the pilot, the synchronous terminal shifts to the next state, or the Sync channel acquisition sub-state, S3.

The Sync channel acquisition sub-state S3 is a state where the synchronous terminal acquires information of a system selected through the above pilot channel acquisition and timing information of the selected system. The synchronous terminal receives a Sync channel message from the base transceiver station selected at the above pilot channel acquisition sub-state over a Sync channel and obtains the information of the selected system and the system timing information from the received Sync channel message. Such a Sync channel message is produced by the system and then sent to the synchronous terminal over the Sync channel.

Information elements as shown in FIG. 7A are written in the Sync channel message received by the synchronous terminal, as follows:
 a) Protocol Revision Level: 8 bits,
 b) Minimum Protocol Revision Level: 8 bits,
 c) System Identification: 15 bits,
 d) Network Identification: 16 bits,
 e) Pilot Pseudo. Noise (PN) sequence offset index: 9 bits,
 f) Long Code State: 42 bits,
 g) System Time: 36 bits,
 h) The number of Leap seconds that have occurred since the start of System Time: 8 bits,
 i) Offset of local time from System Time: 6 bits,
 j) Daylight savings time indicator: 1 bit,
 k) Paging Channel Data Rate: 2 bits,
 l) Frequency assignment: 11 bits,
 m) Extended frequency assignment: 11 bits, and
 n) Orthogonal transmit diversity mode: 2 bits.

The synchronous terminal stores the following information elements from the received Sync channel message in its memory:
 a) Protocol Revision Level: 8 bits,
 b) Minimum Protocol Revision Level: 8 bits, c) System Identification: 15 bits,
d) Network Identification: 16 bits,
e) Pilot PN sequence offset index: 9 bits,
f) Long Code State: 42 bits,
g) System Time: 36 bits,
h) Paging Channel Data Rate: 2 bits, and
i) Orthogonal transmit diversity mode: 2 bits.

After completing the above procedure, the synchronous terminal shifts to the synchronization sub-state S4.

The synchronization sub-state S4 is a state where the synchronous terminal synchronizes its timing with that of the selected CDMA system. The synchronous terminal synchronizes its timing with that of the selected CDMA system on the basis of the information elements in the Sync channel message, received at the above Sync channel acquisition sub-state and stored in its memory. After being timed with the selected. CDMA system, the synchronous terminal enters a standby mode S5.

At the standby mode S5, the synchronous terminal monitors a paging channel of the selected system. Namely, at the standby mode S5, the synchronous terminal receives messages (a system parameter message, an access channel message, a registration request message, etc.) sent over the paging channel.

FIG. 2B is a view showing the layered protocol structure of the conventional asynchronous mobile telecommunications system. In this drawing, the reference numeral 60 denotes an asynchronous terminal, 70 a UTRAN, and 80 an asynchronous core network. The asynchronous terminal 60 comprises a layer 3 61, a layer 2 65 and a layer 1 66. In particular, the layer 3 61 includes a non-access stratum (NAS) part and an access stratum (AS) part. The NAS part includes an asynchronous call control (CC) part 62 for management of a call and an asynchronous mobility management (MM) part 63 for management of a mobility. The AS part includes an asynchronous radio resource control (RRC) part. In the asynchronous system, the asynchronous RRC sub layer is apparently separated from the NAS part. Functions of the asynchronous RRC sub layer are the same as those of the synchronous RR sub layer.

The UTRAN 70 comprises a layer 3 71, a layer 2 73 and a layer 1 74. The layer 3 71 of the UTRAN 70 has no NAS part having asynchronous CC part and asynchronous MM part. The layers 3 to 1 of the UTRAN 70 are connected and correspond respectively to those in the asynchronous terminal 60 and those in the asynchronous core network 80. However, since the UTRAN 70 does not have the NAS part, i.e., the asynchronous CC part and the asynchronous MM part, the NAS parts of the asynchronous terminal 60 and the asynchronous core network 80 are coupled to each other not through the UTRAN 70.

The asynchronous core network 80 comprises a layer 3 having a NAS part 81 connected to that of the asynchronous terminal 60 and a AS part, a layer 2 85 and a layer 1 86 connected respectively to those in the UTRAN 70. The NAS part comprises an asynchronous CC part 82 for management of a call and an asynchronous MM part 83 for management of a mobility. Functions of the layer 3 to 1 of the asynchronous system are similar with those of the synchronous system except for an operating type. Therefore, detailed description of the layer 3 to 1 will be skipped.

The more detailed descriptions about layered protocol structures are well taught in 3.sup.rd Generation Partnership Project (3GPP), Technical Specification Group (TSG)—Radio Access Network (RAN): 3G TS25.301 (Radio Interface Protocol Architecture), 3G TS25.302 (Services provided by the physical layer), 3G TS25.321 (MAC Protocol Specification), 3G TS25.322 (RLC Protocol Specification) and 3G TS25.331 (RRC Protocol Specification) in detail.

In the conventional asynchronous mobile terminal and radio network having the layered protocol structure, the asynchronous terminal 60 receives a system information message from the UTRAN 70 over a broadcast control channel (BCCH) and acquires information necessary to its connection to the asynchronous core network 80, including information related to the asynchronous core network 80 and information about the UTRAN 70, from the received system information message. FIG. 7B shows a format of the system information message received by the asynchronous terminal 60.

The system information message, sent from the UTRAN 70 to the asynchronous terminal 60, contains the following information elements, which are applied in common to all asynchronous terminals connected to the UTRAN of the asynchronous communication system:

1) core network (CN) information,
2) UTRAN mobility information, and
3) other information.

The asynchronous terminal analyzes the CN information elements among the above information elements and acquires public land mobile network (PLMN) identity information, CN domain identity information and non-access stratum (NAS) system information as a result of the analysis.

The PLMN identity information is company identification information and includes a mobile country code (MCC) and a mobile network code (MNC). The CN domain identity information is used to determine whether a currently connected core network is of a circuit switching type or a packet switching type. The NAS system information is information desired in an asynchronous call control (CC) part for management of a call and an asynchronous mobility management (MM) part for management of a mobility.

IMT-2000 systems are the third generation systems which aim to unify the various mobile communication networks and services into one to provide many mobile communication services. The systems can provide multimedia services under multi-environments through various air-interfaces and high capacity. Also, in the aspect of services, the systems can provide multimedia services of speech, image and data up to the rate of 2 Mbps and an international roaming. And, in the aspect of network, the systems are total systems which are based on ATM networks and combine fixed and wireless systems.

IMT-2000 system requires new system concept, high-level adaptation technology, and novel network technology, as well all conventional technologies which were already adopted in the second digital cellular system.

As described above, in the next-generation mobile telecommunication system such as the IMT-2000 system, either the GSM-MAP network used in the above conventional asynchronous mobile telecommunications system or the ANSI-41 network used in the above conventional synchronous mobile telecommunications system should be employed as a core network in order to perform an international roaming in a synchronous or asynchronous mobile telecommunications system of an IMT-2000 system.

According to network deployment scenarios, the IMT-2000 system can have the following four interface architectures; first: synchronous terminal—synchronous radio network—synchronous ANSI-41 network, second: synchronous terminal—synchronous radio network—asynchronous GSM-MAP network, third: asynchronous terminal—asynchronous radio network—synchronous ANSI-41 network and fourth: asynchronous terminal—asynchronous radio network—asynchronous GSM-MAP network.

The IMT-2000 system has the four interface architectures as mentioned above. Therefore, the hybrid type synchronous terminal must recognize an operating type of a core network currently connected thereto, and the hybrid type synchronous radio network should provide core network operating type information and others information to the hybrid type synchronous terminal. The core network operating type information and the others information must be contained in the Sync channel message that the synchronous terminal, after being powered on, receives through the Sync channel in the above-mentioned conventional interfacing manner.

Similarly, the hybrid type asynchronous terminal must recognize an operating type of a core network currently connected thereto, and the hybrid type asynchronous radio network should provide the core network operating type information and others information to the hybrid type asynchronous terminal. The core network operating type information and the others information must be contained in the system information message transmitted to the asynchronous terminal, after being powered on, so that the asynchronous terminal receives through the broadcast control channel (BCCH) in the above-mentioned conventional interfacing manner.

However, as shown in FIG. 7A, the Sync channel message used in the conventional synchronous terminal and radio network contain only information (information regarding a synchronous core network) defined at the Sync channel acquisition sub-state of the synchronous terminal, with neither core network operating type information nor information about an asynchronous core network.

Because there is no core network operating type information in the Sync channel message, the synchronous terminal cannot determine which one of the CC/MM protocol for the ANSI-41 core network or the CC/MM protocol for the GSM-MAP core network to use at the layer 3 in its protocol stack structure, and be thus interfaced with any asynchronous core network. Of course, because the synchronous terminal is set to the synchronous CC/MM protocol in the conventional synchronous terminal and radio network, they have no particular problem in interfacing to a core network currently connected thereto, so far as the connected core network is a synchronous core network.

Also, as shown in FIG. 7B, the system information message used in the conventional asynchronous terminal and radio network contain only information (information regarding an asynchronous core network) defined at the BCCH acquisition sub-state of the asynchronous terminal, with neither core network operating type information nor information about a synchronous core network.

Because there is no core network operating type information in the system information message, the asynchronous terminal cannot determine which one of the CC/MM protocol for the ANSI-41 core network or the CC/MM protocol for the GSM-MAP core network to use at the layer 3 in its protocol stack structure, and be thus interfaced with any synchronous core network. Of course, because the asynchronous terminal is set to the asynchronous CC/MM protocol in the conventional asynchronous terminal and radio network, they has no particular problem in interfacing with a core network currently connected thereto, so far as the connected core network is an asynchronous core network.

In other words, the conventional synchronous terminal and radio network have a disadvantage in that the synchronous terminal cannot be interfaced with any other networks than a synchronous core network connected thereto because it cannot recognize core network operating type information and core network related information.

Similarly, the conventional asynchronous terminal and radio network have a disadvantage in that the asynchronous terminal cannot be interfaced with any other networks than an asynchronous core network because they cannot recognize core network operating type information and core network related information.

SUMMARY OF THE INVENTION

Therefore, the present invention has been made in view of the above problems, and it is an object of the present invention to provide a method, an apparatus and a computer readable record media storing instructions for executing the same method for interfacing among a synchronous or asynchronous terminal, a synchronous or asynchronous radio network and a synchronous or asynchronous core network in a next-generation mobile telecommunications system.

It is another object of the present invention to provide a method for interfacing a synchronous terminal with a synchronous or asynchronous core network, wherein a synchronous radio network determines the operating type of the core network when the core network has a connection thereto, and sends the determined core network operating type information and information related to the core network to the synchronous terminal over a Sync channel, and the synchronous terminal recognizes the core network on the basis of the core network operating type information and sets a protocol according to the core network related information, so as to smoothly perform a message interfacing operation with the core network.

It is yet another object of the present invention to provide a method for interfacing an asynchronous terminal to a synchronous or asynchronous core network, wherein an asynchronous radio network determines the operating type of the core network when the core network has a connection thereto, and sends the determined core network operating type information and information related to the core network to the asynchronous terminal over a BCCH, and the asynchronous terminal recognizes the core network on the basis of the core network operating type information and sets a protocol according to the core network related information, so as to smoothly perform a message interfacing operation with the core network.

In accordance with one aspect of the present invention, there is provided a method for interfacing among a terminal, a radio network and a core network connected to the radio network in a mobile telecommunication system, wherein the radio network has a base station (BS) and each of the terminal and the radio network has a hybrid operating type being possible to be set as either a synchronous operating type or an asynchronous operating type, said method comprising the steps of: a) at the BS, determining an operating type of the core network and generating core network operating type information representing the operating type of the core network; b) at the BS, setting an operating type of the BS to the synchronous operating type or the asynchronous operating type on the basis of the core network operating type information; c) at the BS, providing the terminal with the core network operating type information and information related to the core network through a predetermined channel in a form of a message; d) extracting, at the terminal, the core network operating type information from a received message, the core network operating type information being inserted into a predetermined location of the message; e) recognizing, at the terminal, the operating type of the core network on the basis of the extracted core network operating type information; and f) at the terminal, setting an operating type of the terminal to the synchronous operating type or the asynchronous operating type on the basis of the recognized operating type of the core network.

In accordance with another aspect of the present invention, there is provided an apparatus for interfacing among a terminal, a radio network and a core network connected to the radio network in a mobile telecommunication system, wherein the radio network has a base station (BS) and each of the terminal and the radio network has a hybrid operating type being possible to be set as either a synchronous operating type or an asynchronous operating type, said apparatus comprising: determination means, contained in the BS, for determining an operating type of the core network; first setting means, employed in the BS, for setting an operating type of the BS to the synchronous operating type or the asynchronous operating type on the basis of the determined operating type of the core network; message means, included in the BS, for providing the terminal with core network operating type information representing the determined operating type of the core network and information related to the core network through a predetermined channel; receiver means, provided in the terminal, for receiving a channel message having the core network operating type information and the information related to the core network; extraction means, contained in the terminal, for extracting the core network operating type information inserted into a predetermined location of the channel message; detection means, contained in the terminal, for recognizing the operating type of the core network on the basis of the extracted core network operating type information; and second setting means, contained in the terminal, for setting an operating type of the terminal to the synchronous operating type or the asynchronous operating type on the basis of the recognized operating type of the core network.

In accordance with a. further aspect of the present invention, there is provided a method for interfacing among a terminal, a radio network and a core network connected to the radio network in a mobile telecommunication system, wherein the radio network has a base station (BS) and the terminal has a hybrid operating type being possible to be set as either a synchronous operating type or an asynchronous operating type, the method comprising the steps of: a) storing core network operating type information and information related to the core network on a storage device; b) reading the core network operating type information and information related to the core network stored on the storage device during a time period of initialization of the BS; c) providing the terminal with the core network operating type information and information related to the core network as a message through a predetermined channel; d) extracting, at the terminal, the core network operating type information from a received message, the core network operating type information being inserted into a predetermined location of the received message; e) recognizing, at the terminal, the operating type of the core network on the basis of the extracted core network operating type information; and f) setting an operating type of the terminal to the synchronous operating type or the asynchronous operating type on the basis of the recognized operating type of the core network.

In accordance with further another aspect of the present invention, there is provided an apparatus for interfacing among a terminal, a radio network and a core network connected to the radio network in a mobile telecommunication system, wherein the radio network has a base station (BS) and the terminal has a hybrid operating type being possible to be set as either a synchronous operating type or an asynchronous operating type, comprising: a storage device, contained in the BS, for storing core network operating type information representing operating type of the core network and information related to the core network; first extraction means, contained in the BS, for reading the core network operating type information and information related to the core network stored in the storage device during a time period of initialization of the BS; message means, contained in the BS, for providing the terminal with the core network operating type information and information related to the core network as a message through a predetermined channel; second extraction means, contained in the terminal, for extracting the core network operating type information from a received message, the core network operating type information being inserted into a predetermined location of the received message; detection means, contained in the terminal, for recognizing the operating type of the core network on the basis of the extracted core network operating type information; and setting means, contained in the terminal, for setting an operating type of the terminal to the synchronous operating type or the asynchronous operating type on the basis of the recognized operating type of the core network.

In accordance with a further another aspect of the present invention, there is provided a method for interfacing between a radio network and a core network connected to the radio network in a mobile telecommunication system, wherein the radio network has a base station (BS) having a hybrid operating type being possible to be set as either a synchronous operating type or an asynchronous operating type, said method comprising the steps of: a) determining an operating type of the core network; b) setting an operating type of the BS to the synchronous operating type or the asynchronous operating type on the basis of core network operating type information representing the determined operating type of the core network; and c) providing the terminal with the core network operating type information and information related to the core network through a predetermined channel in a form of a message.

In accordance with a further aspect of the present invention, there is provided an apparatus for interfacing between a radio network and a core network connected to the radio network in a mobile telecommunication system, wherein the radio network has a base station (BS) having a hybrid operating type being possible to be set as either a synchronous operating type or an asynchronous operating type, said apparatus comprising: determination means for determining an operating type of the core network; setting means for setting an operating type of the BS to the synchronous operating type or the asynchronous operating type on the basis of core network operating type information representing the determined operating type of the core network; and message means for providing the terminal with the core network operating type information and information related to the core network through a predetermined channel in a form of a message.

In accordance with a further aspect of the present invention, there is provided a computer readable media storing a program instructions, the program instructions disposed on a computer to perform a method for interfacing between a radio network and a core network connected to the radio network in a mobile telecommunication system, wherein the radio network has a base station (BS) having a hybrid operating type being possible to be set as either a synchronous operating type or an asynchronous operating type, said method comprising the steps of: a) determining an operating type of the core network; b) setting an operating type of the BS to the synchronous operating type or the asynchronous operating type on the basis of core network operating type information representing the determined operating type of the core network; and c) providing the terminal with the core network operating type information and information related to the core network through a predetermined channel in a form of a message.

In accordance with another aspect of the present invention, there is provided a method for interfacing among a terminal, a radio network and a core network connected to the radio network in a mobile telecommunication system, wherein the radio network has a base station (BS) and the terminal has a hybrid operating type being possible to be set as either a synchronous operating type or an asynchronous operating type, the method comprising the steps of: a) storing core network operating type information representing operating type of the core network and information related to the core network on a storage device; b) reading the core network operating type information and information related to the core network stored on the storage device during a time period of initialization of the BS; and c) periodically providing the terminal with the core network operating type information and information related to the core network as a message through a predetermined channel.

In accordance with still another aspect of the present invention, there is provided an apparatus for interfacing among a terminal, a radio network and a core network connected to the radio network in a mobile, telecommunication system, wherein the radio network has a base station (BS) and the terminal has a hybrid operating type being possible to be set as either a synchronous operating type or an asynchronous operating type, comprising: a storage device, contained in the BS, for storing core network operating type information representing operating type of the core network and information related to the core network; extraction means, contained in the BS, for reading the core network operating type information and information related to the core network stored in the storage device during a time period of initialization of the BS; and message means, contained in the BS, for periodically providing the terminal with the core network operating type information and information related to the core network as a message through a predetermined channel.

In accordance with still another aspect of the present invention, there is provided a computer readable media storing a program instructions, the program instructions disposed on a computer to perform a method for interfacing among a terminal, a radio network and a core network connected to the radio network in a mobile telecommunication system, wherein the radio network has a base station (BS) and the terminal has a hybrid operating type being possible to be set as either a synchronous operating type or an asynchronous operating type, the method comprising the steps of: a) storing core network operating type information representing operating type of the core network and information related to the core network on a storage device; b) reading the core network operating type information and information related to the core network stored on the storage device during a time period of initialization of the BS; and c) periodically providing the terminal with the core network operating type information and information related to the core network as a message through a predetermined channel.

BRIEF DESCRIPTION OF THE DRAWINGS

The above and other objects, features and advantages of the present invention will, be more clearly understood from the following detailed description taken in conjunction with the accompanying drawings, in which:

FIG. 1A and FIG. 1B show core network interface architectures of conventional synchronous/asynchronous mobile telecommunications systems, wherein:

FIG. 1A is a view showing a core network interface architecture of the conventional synchronous mobile telecommunications system; and FIG. 1B is a view showing a core network interface architecture of the conventional asynchronous mobile telecommunications system;

FIG. 2A and FIG. 2B show layered protocol structures of the conventional synchronous/asynchronous mobile telecommunications systems, wherein:

FIG. 2A is a view showing a layered protocol structure of the conventional synchronous mobile telecommunications system; and FIG. 2B is a view showing a layered protocol structure of the conventional asynchronous mobile telecommunications system;

FIG. 3 is a view showing a protocol stack structure for interfacing a terminal and a base station with a core network in a next-generation mobile telecommunications system;

FIG. 4A, FIG. 4B, FIG. 4C, and FIG. 4D show core network interface architectures of the next-generation mobile telecommunications system, wherein:

FIG. 4A is a view showing a synchronous ANSI-41 core network interface architecture of hybrid type synchronous mobile terminal and radio network;

FIG. 4B is a view showing an asynchronous GSM-MAP core network interface architecture of hybrid type synchronous mobile terminal and radio network;

FIG. 4C is a view showing an asynchronous GSM-MAP core network interface architecture of hybrid type asynchronous mobile terminal and radio network; and FIG. 4D is a view showing a synchronous ANSI-41 core network interface architecture of hybrid type asynchronous mobile terminal and radio network;

FIG. 5A, FIG. 5B, FIG. 5C, and FIG. 5D show layered protocol structures of the next-generation mobile telecommunications system, wherein:

FIG. 5A is a view showing layered protocol structures of hybrid type synchronous mobile terminal and radio network and the synchronous ANSI-41 core network;

FIG. 5B is a view showing layered protocol structures of hybrid type synchronous mobile. terminal and radio network and the asynchronous GSM-MAP core network;

FIG. 5C is a view showing layered protocol structures of hybrid type asynchronous mobile terminal. and radio network and the synchronous ANSI-41 core network; and FIG. 5D is a view showing layered protocol structures of hybrid type asynchronous mobile terminal and radio network and the asynchronous GSM-MAP core network;

FIG. 6 is a flowchart illustrating state transitions of a synchronous terminal in the conventional synchronous mobile telecommunications system;

FIG. 7A and FIG. 7B show format of a message received by the terminal from the conventional synchronous radio network, wherein:

FIG. 7A is a view showing a format of a Sync channel message received by the synchronous terminal from the conventional synchronous radio network;

FIG. 7B is a view showing a format of a system information message received by an asynchronous terminal from the conventional asynchronous radio network;

FIG. 9A and FIG. 9B show a Sync channel message received by a hybrid type synchronous terminal from in a hybrid type synchronous radio network in accordance with the present invention, wherein:

FIG. 9A is a view showing a format of the Sync channel message when a core network connected to a hybrid type synchronous radio network is a GSM-MAP network; and FIG. 9B is a view showing a format of the Sync channel message when the core network connected to the hybrid type synchronous radio network is an ANSI-41 network;

FIG. 10A, FIG. 10B, FIG. 10C, and FIG. 10D show a master information block in a system information message received by a hybrid type asynchronous terminal from a hybrid type asynchronous radio network in accordance with the present invention, wherein:

FIGS. 10A and 10B are views showing formats of the master information block when a core network connected to a hybrid type asynchronous radio network, or a UTRAN, is the GSM-MAP network; and FIGS. 10C and 10D are views showing formats of the master information block when the core network connected to the UTRAN is the ANSI-41 network;

FIG. 11A and FIG. 11B show flow charts illustrating a method for interfacing a hybrid type synchronous terminal with a core network in accordance with the present invention, wherein:

FIG. 11A is a flowchart illustrating a procedure where a hybrid type synchronous radio network sends core network operating type information and information related to core network to the hybrid type synchronous terminal; and FIG. 11B is a flowchart illustrating a procedure where the hybrid type synchronous terminal receives the core network operating type information and the information related to core network from the hybrid type synchronous radio network and then is interfaced with the core network on the basis of the received information; and FIG. 12A and FIG. 12B show flow charts illustrating a method for interfacing a hybrid type asynchronous terminal to a core network in accordance with the present invention, wherein:

FIG. 12A is a flowchart illustrating a procedure where a hybrid type asynchronous radio network sends core network operating type information and information related to core network to the hybrid type asynchronous terminal; and FIG. 12B is a flowchart illustrating a procedure where the hybrid type asynchronous terminal receives the core network operating type information and the information related to core network from the hybrid type asynchronous radio network and then is interfaced with the core network on the basis of the received information.

DETAILED DESCRIPTION OF THE ILLUSTRATED EMBODIMENTS

In the specification, a radio network means a network including a plurality of base transceiver stations (BTS) and at least a base station controller for controlling the plurality of BTSs in a synchronous or an asynchronous mobile telecommunication system.

Functions for controlling the base transceiver station can be distributively performed in the plurality of the base transceiver stations, or can be concentrically performed in the base station controller. Therefore, in this specification, a terminology "base station," which includes the base transceiver station and the base station controller, is used.

Referring to FIG. 3, it is illustrated a protocol stack structure for interfacing a mobile terminal, a base transceiver station/base station controller (BTS/BSC) and a core network having the same or a different operating type with/from the mobile terminal in a next-generation mobile telecommunications system such as the IMT-2000 system.

FIG. 4A, FIG. 4B, FIG. 4C, and FIG. 4D show core network interface architectures of the next-generation mobile telecommunications system such as the IMT-2000 system.

Figure 1A:
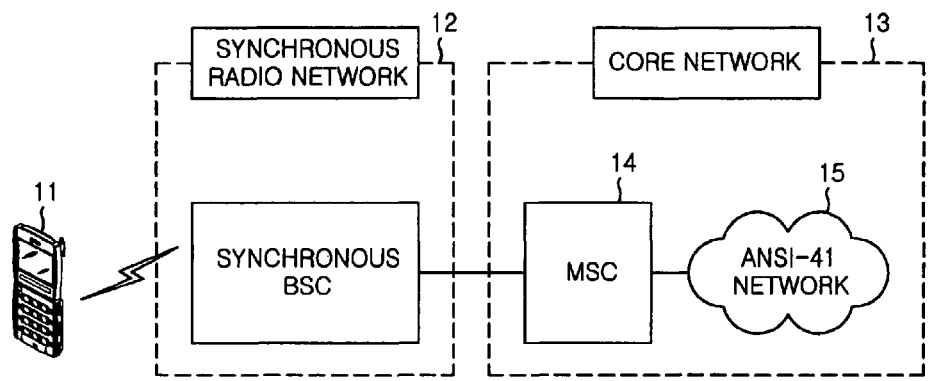
Figure 1B:
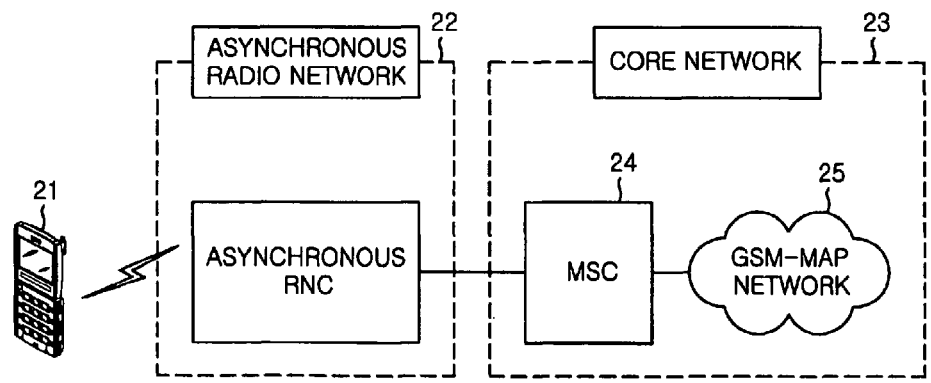
Figure 2A:
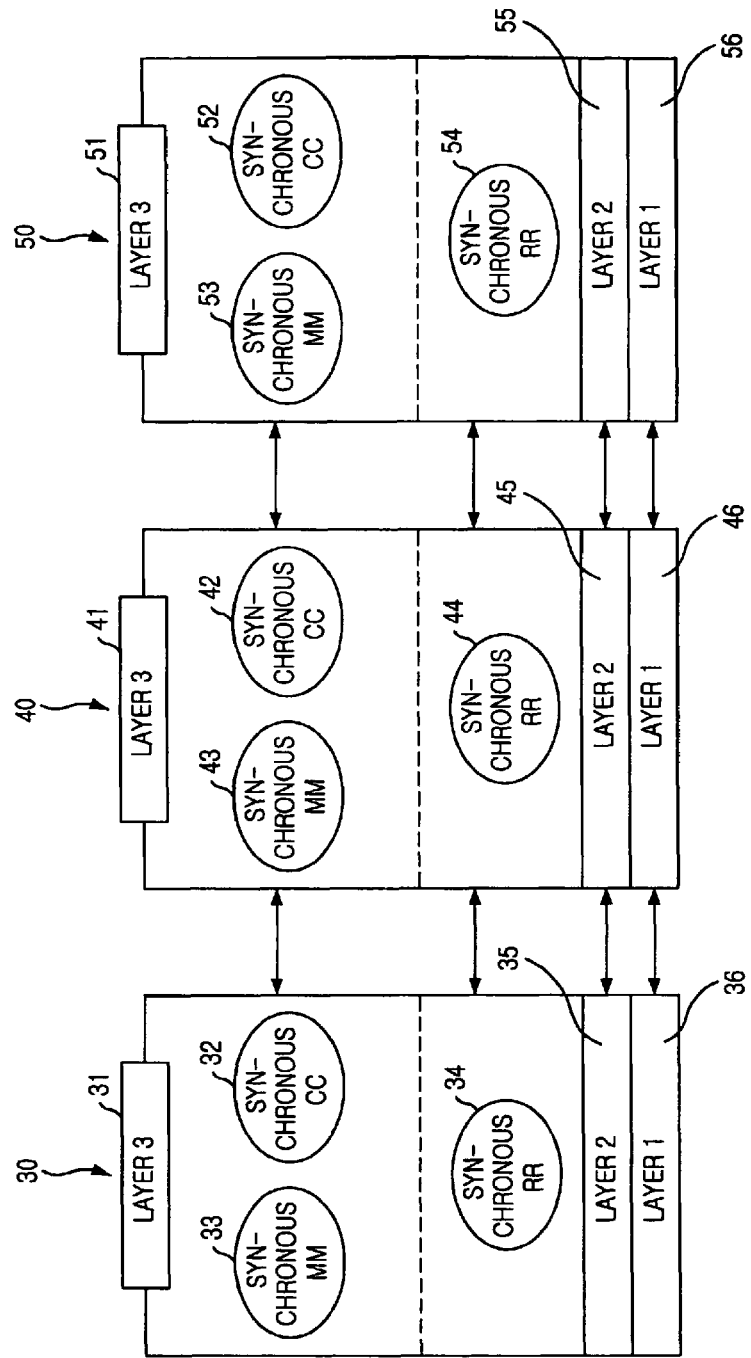
Figure 2B:
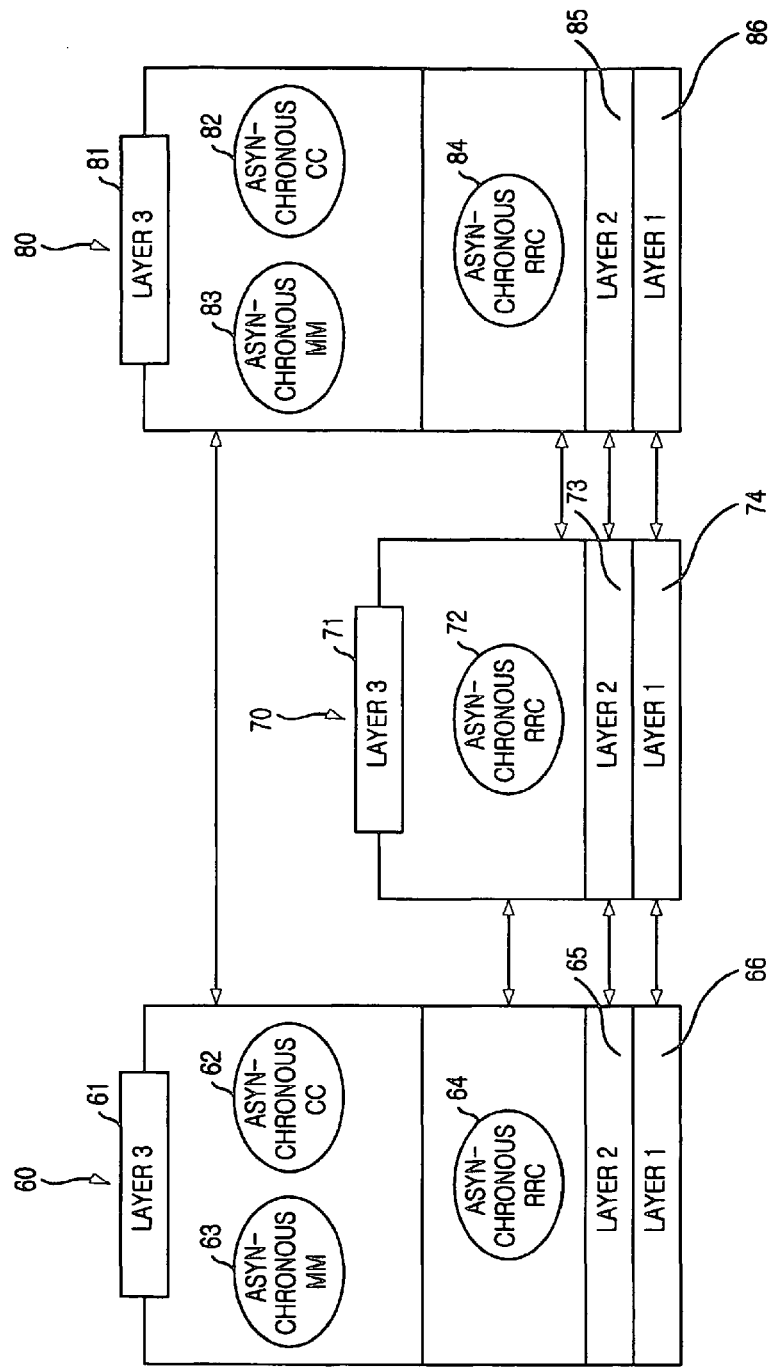
Figure 4A:
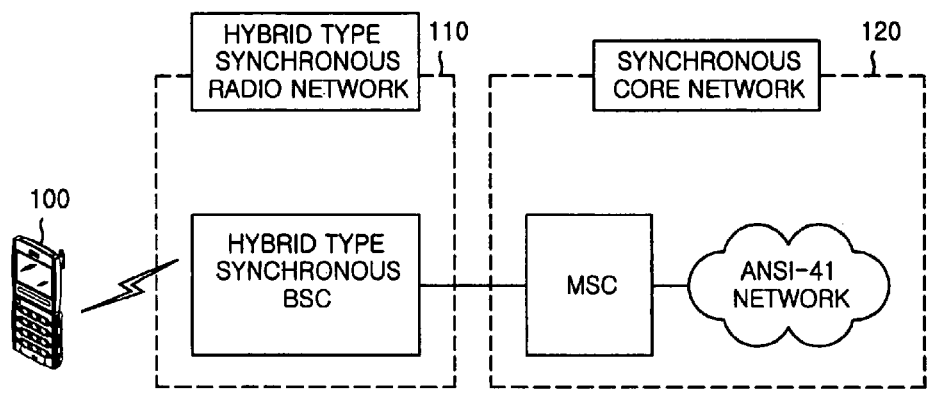

FIG. 4A is a view showing a synchronous ANSI-41 core network interface architecture of a hybrid type synchronous radio network. In this drawing, the reference numeral 100 denotes a hybrid type synchronous terminal, 110 a hybrid type synchronous radio network, and 120 a synchronous core network which includes an ANSI-41 network.

Figure 4B:
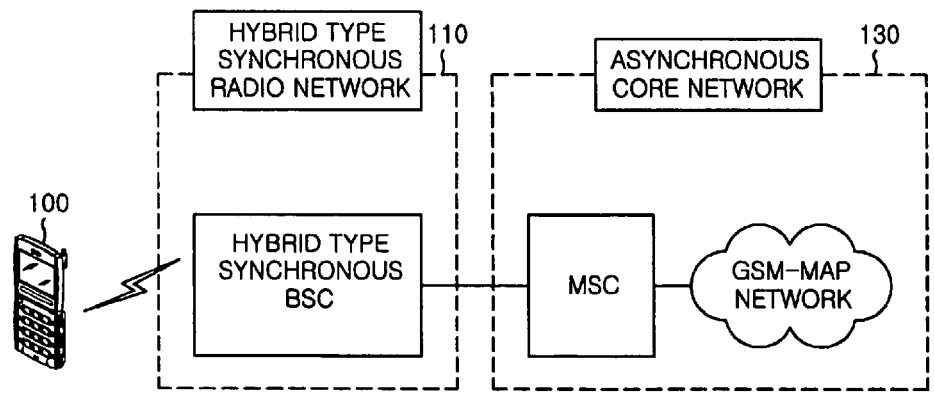

FIG. 4B is a view showing an asynchronous GSM-MAP core network interface architecture of the hybrid type synchronous radio network. In this drawing, the reference numeral 100 denotes a hybrid type synchronous terminal, 110 a hybrid type synchronous radio network, and 130 an asynchronous core network which includes a GSM-MAP network.

Figure 4C:
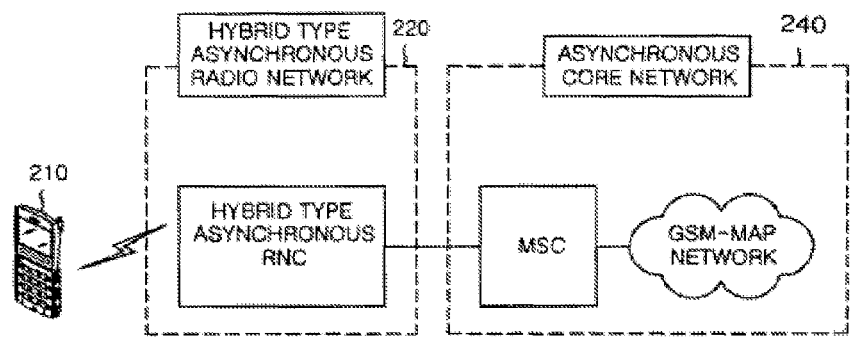

FIG. 4C is a view showing an asynchronous GSM-MAP core network interface architecture of a hybrid type asynchronous radio network. In this drawing, the reference numeral 210 denotes a hybrid type asynchronous terminal, 220 denotes a hybrid type UTRAN which is a hybrid type asynchronous radio network, and 240 denotes a core network which is connected to the hybrid type UTRAN 220 and includes an asynchronous GSM-MAP network.

Figure 4D:
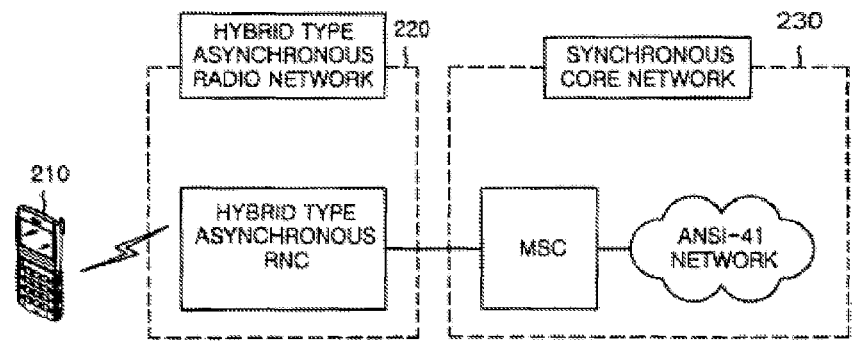

FIG. 4D is a view showing a synchronous ANSI-41 core network interface architecture of the hybrid type asynchronous radio network. In this drawing, the reference numeral 210 denotes a hybrid type asynchronous terminal, 220 denotes a hybrid type UTRAN which is a hybrid type asynchronous radio network, and 230 denotes a core network which is connected to the hybrid type UTRAN 220 and includes a synchronous ANSI-41 network. In order to be operable adaptively to the above four interface architectures, each of the hybrid type synchronous and asynchronous terminals in the next-generation mobile telecommunications system has both asynchronous CC and MM protocol entities serving for the GSM-MAP core network and synchronous CC and MM protocol entities serving for the ANSI-41 core network at the layer 3 in the protocol stack structure, which is a different from each of the conventional synchronous and asynchronous terminals.

FIG. 5A, FIG. 5B, FIG. 5C, and FIG. 5D show layered protocol structures of the next-generation mobile telecommunications system.

Figure 5A:
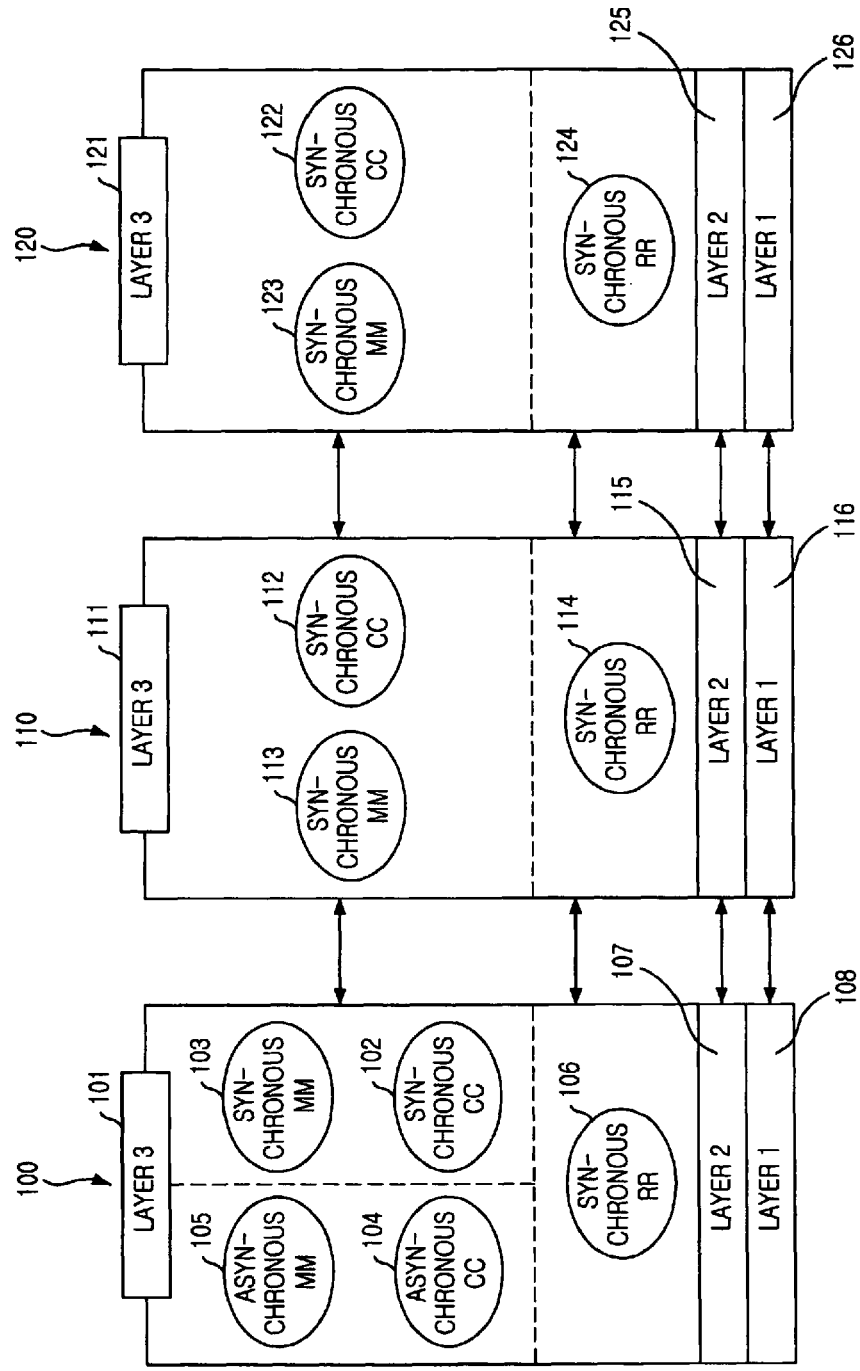

FIG. 5A is a view showing the layered protocol structure of a hybrid type synchronous terminal, a hybrid type synchronous radio network and the synchronous ANSI-41 core network. In this drawing, the reference numeral 100 denotes a hybrid type synchronous terminal, 110 denotes a hybrid type synchronous radio network, and 120 denotes an ANSI-41 core network which is a synchronous core network connected to the hybrid type synchronous radio network 110.

The hybrid type synchronous terminal 100 comprises a layer 3 101, a layer 2 107 and a layer 1 108. The layer 3 101 comprises a synchronous CC part 102, a synchronous MM part 103, an asynchronous CC part 104, an asynchronous MM part 105 and a synchronous radio resource part 106. The hybrid type synchronous terminal 100 selectively makes a CC/MM protocol active according to a core network operating type. Information for identifying the core network operating type is given to the hybrid type synchronous terminal 100.

For example, if the hybrid type synchronous terminal 100 is currently connected to the ANSI-41 core network 120, the layer 3 101 therein activates protocols of the synchronous CC part 102 and synchronous MM part 103 to perform a message interfacing operation with the ANSI-41 core network 120.

The hybrid type synchronous radio network 110 comprises a layer 3 111, a layer 2 115 and a layer 1 116, which activate their protocols corresponding respectively to those in the hybrid type synchronous terminal 100 and those in the ANSI-41 core network 120 to transmit and receive messages.

The ANSI-41 core network 120 comprises a layer 3 121, a layer 2 125 and a layer 1 126. The layer 3 121 comprises a synchronous CC part 122, a synchronous MM part 123 and a synchronous RR part 124.

On the other hand, a hybrid type synchronous mobile terminal, a hybrid type synchronous radio network and an asynchronous core network have layered protocol structures as shown in FIG. 5B when the core network connected thereto is of an asynchronous operating type as shown in FIG. 4B.

In FIG. 5B, the reference numeral 100 denotes a hybrid type synchronous terminal, 110 denotes a hybrid type synchronous radio network, and 130 denotes a GSM-MAP core network which is an asynchronous core network.

The hybrid type synchronous terminal 100 comprises a layer 3 101 having a NAS part and an AS part, a layer 2 107 and a layer 1 108. The NAS part includes a synchronous CC part 102, a synchronous MM part 103, an asynchronous CC part 104 and an asynchronous MM part 105. The AS part includes a synchronous RR part 106. The hybrid type synchronous terminal 100 selectively makes a CC/MM protocol active according to a core network operating type.

For example, if the hybrid type synchronous terminal 100 is currently connected to the GSM-MAP core network 130, the layer 3 101 therein activates protocols of the asynchronous CC part 104 and asynchronous MM part 105 to perform a message interfacing operation with the GSM-MAP core network 130.

The hybrid type synchronous radio network 110 comprises a layer 3 111 having a NAS part and an AS part, a layer 2 115 and a layer 1 116, which activate their protocols corresponding respectively to those in the hybrid type synchronous terminal 100 and those in the GSM-MAP core network 130 to transmit and receive messages.

The GSM-MAP core network 130 comprises a layer 3 131 having aNAS part and an AS part, a layer 2 135 and a layer 1 136. The NAS part includes an asynchronous CC part 132 and an asynchronous MM part 133. The AS part includes an asynchronous RRC part 134.

The layers 3 to 1 of the hybrid type synchronous radio network 110 are connected and correspond respectively to those in the hybrid type synchronous terminal 100 and those in the asynchronous core network. 130. However, the NAS parts of the hybrid type asynchronous terminal 100 and the asynchronous core network 130 are coupled to each other not through the hybrid type synchronous radio network 110.

Figure 5C:
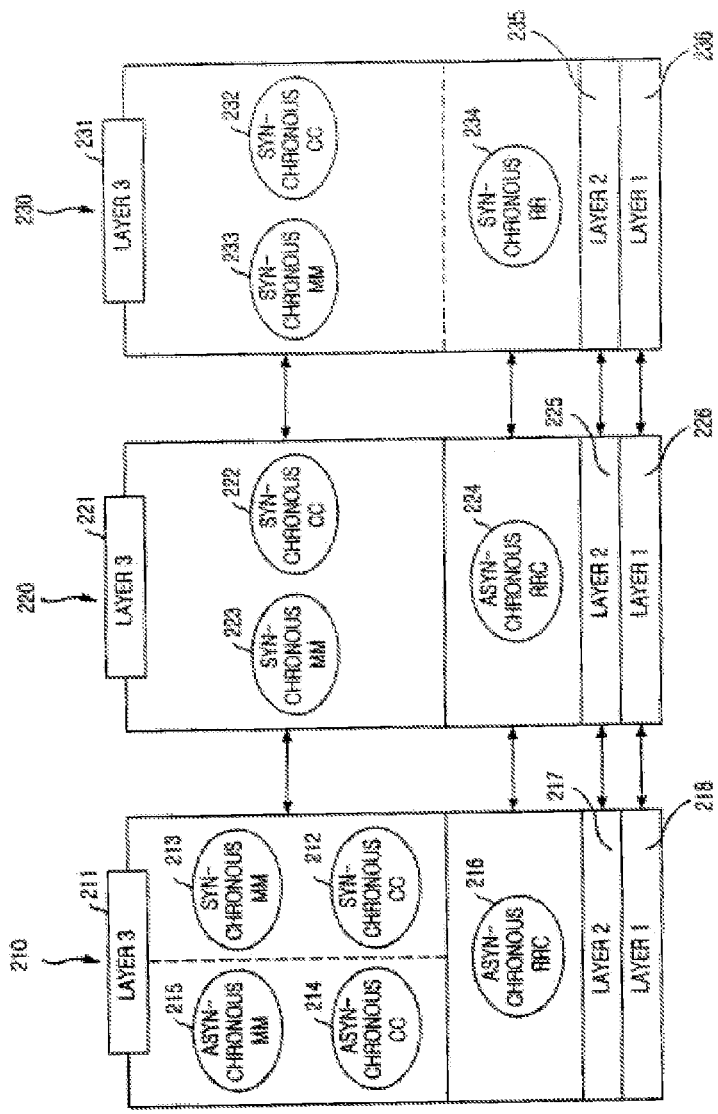

FIG. 5C is a view showing layered protocol structures of a hybrid type asynchronous mobile terminal, a hybrid type asynchronous radio network and a synchronous ANSI-41 core network. In this drawing, the reference numeral 210 denotes a hybrid type asynchronous terminal, 220 denotes a hybrid type UTRAN which is a hybrid type asynchronous radio network, and 230 denotes an ANSI-41 core network connected to the hybrid type UTRAN 220.

The hybrid type asynchronous terminal 210 comprises a layer 3 211, a layer 2 217 and a layer 1 218. The layer 3 includes a synchronous CC part 212, a synchronous MM part 213, an asynchronous CC part 214, an asynchronous MM part 215 and asynchronous RRC part 216 and selectively activates a synchronous CC/MM protocol or an asynchronous CC/MM protocol.

For example, if the hybrid type asynchronous terminal 210 is currently connected to the ANSI-41 core network 230, the layer 3 therein activates a protocol between the synchronous CC part 212 and synchronous MM part 213 to perform a message interfacing operation with the ANSI-41 core network 230.

FIG. 5D is a view showing layered protocol structures of a hybrid type asynchronous mobile terminal, a hybrid type asynchronous radio network, and an asynchronous GSM-MAP core network. In this drawing, the reference numeral 210 denotes a hybrid type asynchronous terminal, 220 denotes hybrid type UTRAN which is a hybrid type asynchronous radio network, and 240 denotes an asynchronous GSM-MAP core network connected to the hybrid type UTRAN 220.

The hybrid type asynchronous terminal 210 comprises a layer 3 211 having a NAS part and an AS part, a layer 2 217 and a layer 1 218. The NAS part includes a synchronous CC part 212, a synchronous MM part 213, an asynchronous CC part 214 and an asynchronous MM part 215 and selectively activates a synchronous CC/MM protocol or an asynchronous CC/MM protocol. The AS part includes an asynchronous RRC part 216.

The hybrid type asynchronous radio network 220 comprises a layer 3 221 having a NAS part and an AS part, a layer 2 225 and a layer 1 226, which activate their protocols corresponding respectively to those in the hybrid type asynchronous terminal 210 and those in the GSM-MAP core network 240 to transmit and receive messages.

The GSM-MAP core network 240 comprises a layer 3 241 having a NAS part and an AS part, a layer 2 245 and a layer 1 246. The NAS part includes an asynchronous CC part 242 and an asynchronous MM part 243. The. AS part includes an asynchronous RRC part 244.

For example, if the hybrid type asynchronous terminal 210 is currently connected to the GSM-MAP core network 240, the NAS part therein activates protocols of the asynchronous CC part 214 and asynchronous MM part 215 to perform a message interfacing operation with the GSM-MAP core network 240.

The layers 3 to 1 of the hybrid type asynchronous radio network 220 are connected and correspond respectively to those in the hybrid type asynchronous terminal 210 and those in the asynchronous core network 240. However, the NAS parts of the hybrid type asynchronous terminal 210 and the asynchronous core network 240 are coupled to each other not through the hybrid type asynchronous radio network 220.

<Embodiment 1>

In a method for interfacing a hybrid type synchronous terminal to a synchronous core network, the hybrid type synchronous mobile terminal and radio work have core network interface architectures as described above with reference to FIGS. 4A and 4 B and the associated layered protocol structures as described above with reference to FIGS. 5A and 5B.

Figure 8A:
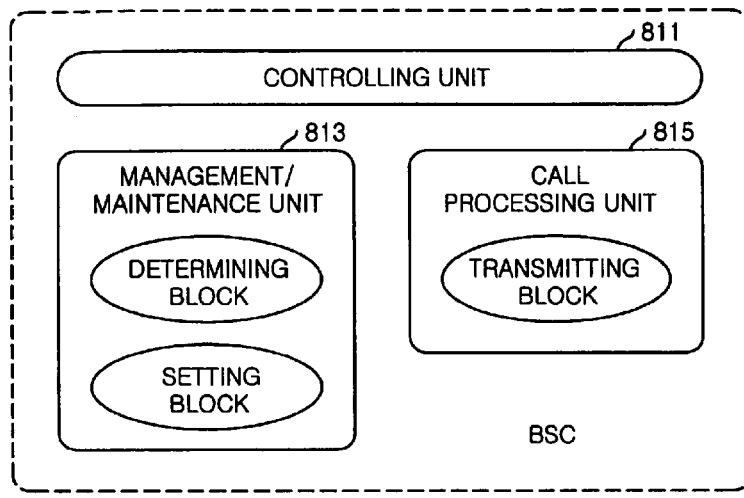
FIG. 8A is a block diagram of a base station controller for interfacing among a terminal, a radio network and a core network.

FIG. 8A is a block diagram of a BS controller for interfacing the BS with a core network having the same or a different operating type with/from the BS.

The base station (BS) includes a controller 811 which performs control functions of the BS, for example, information transmission, call processing, etc.

The BS controller provides a terminal set synchronous or asynchronous with a determined core network operating type information and an information related to the core network to be connected, thereby allowing the terminal to be interfaced with the core network having the same or a different operating type with/from the terminal.

A management/maintenance block 813 determines an operating type of the core network to be connected on the basis of information stored on the BS controller or on the basis of message exchanged with the connected core network.

The stored information can be stored on a read only memory (ROM) in the controller 811, or on a dip switch to which a central processing unit (CPU) of the controller 811 is connected. The message exchanged with the core network is preferably a management/maintenance message or a signaling message.

A call processing block 815 provides the terminal with the core network operating type information and the information related to the core network through a channel. In a synchronous operating type, the core network operating type information and the information related to the core network are inserted into a core network operating type information field of a synchronous channel and transmitted to the terminal. The core network operating type information transmitted to the terminal is GSM-MAP information representing an asynchronous core network, or ANSI-41 information representing a synchronous core network.

Figure 8B:
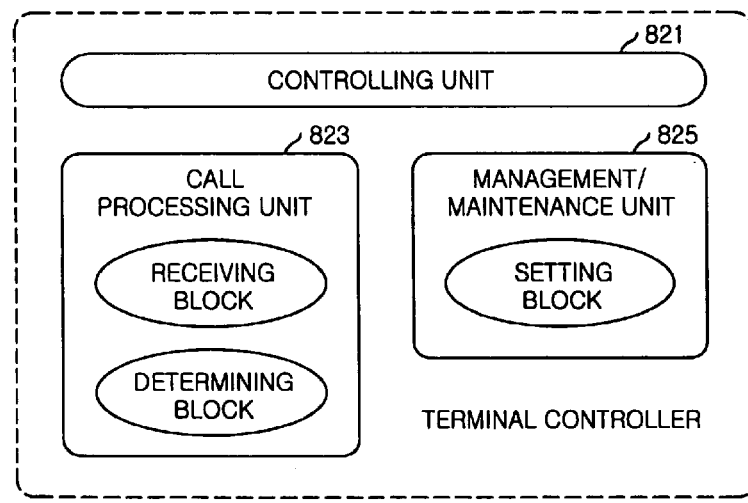
FIG. 8B is a block diagram of a terminal controller for interfacing among a terminal, a radio network and a core network.

FIG. 8B is a block diagram of a terminal controller for interfacing the terminal with a core network, wherein the core network is of a synchronous or an asynchronous type.

The terminal controller comprises a controlling unit 821, a call processing unit 823, and a management/maintenance unit 825.

The call processing unit 823 includes a receiving block which receives channel message having core network operating type information, and a determining block which extracts the core network operating type information inserted into a pre-selected location of the channel message and determines whether the core network is of a synchronous or an asynchronous type. The management/maintenance unit 825 includes a setting block which sets the terminal as an operating type corresponding to the core network operating type information. The controlling unit 821 performs general control functions of the terminal, for example, call processing function, management/maintenance function, etc. The terminal controller further includes a memory extracting and storing information related to the core network from the channel message. Here, the information related to the core network corresponds to the core network operating type information.

As described above, the method and the apparatus in accordance with the present invention adaptively sets a protocol and interfaces among the terminal, the base station and the core network on the basis of an operating type of the core network. Preferred formats of messages communicated between the terminal and the base station in order to perform setting and interfacing functions are illustrated in FIGS. 9A and 9B.

Figure 9A:
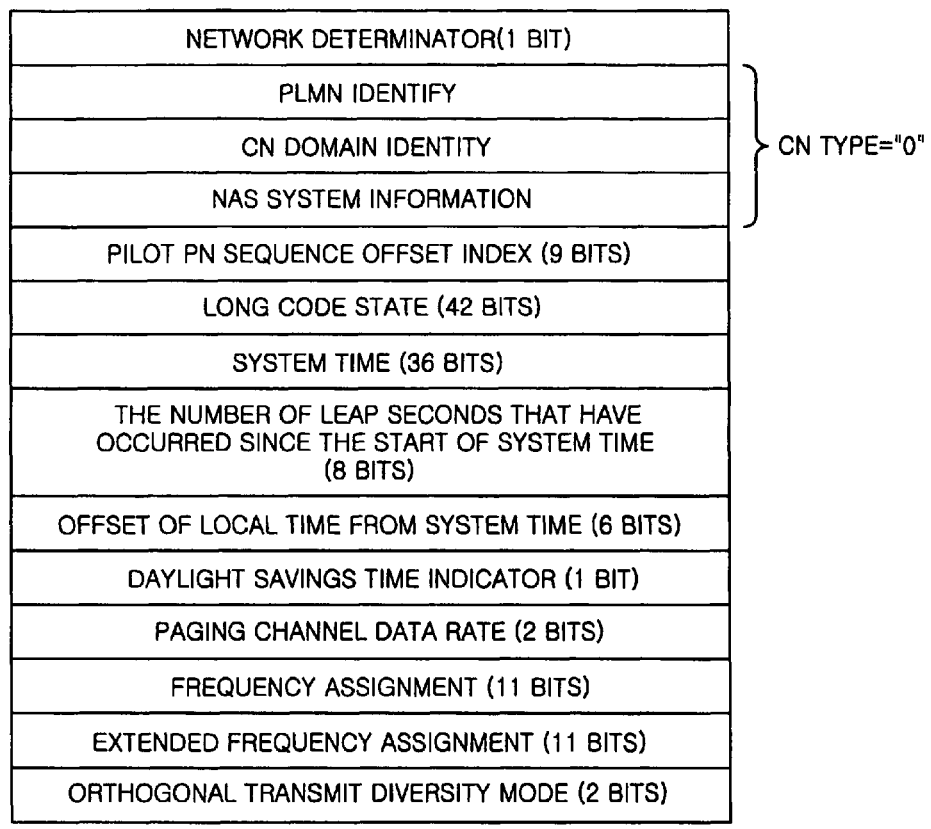

FIG. 9A shows a format of a synchronous channel message received by a synchronous terminal when a core network connected to the radio network is GSM-MAP. FIG. 9B shows a format of a synchronous channel message received by a synchronous terminal when a core network connected to the radio network is ANSI-41 core network.

If the core network operating type information is ANSI-41 information representing a synchronous core network, the information related to core network includes information P_REV representing a revision level of a system protocol, information M_P_REV representing a minimum revision level, system identification SID and network identification NID. If the core network operating type information is GSM-MAP information representing an asynchronous core network, the information related to core network includes public land mobile network identity PLMN_ID, core network domain identity and non-access stratum (NAS) system information. The public land mobile network (PLMN) identity PLMN_ID includes mobile country code (MCC) and mobile network code (MNC). The terminal identifies a provider of a system to which it accesses based on the PLMN identity PLMN_ID.

Figure 11A:
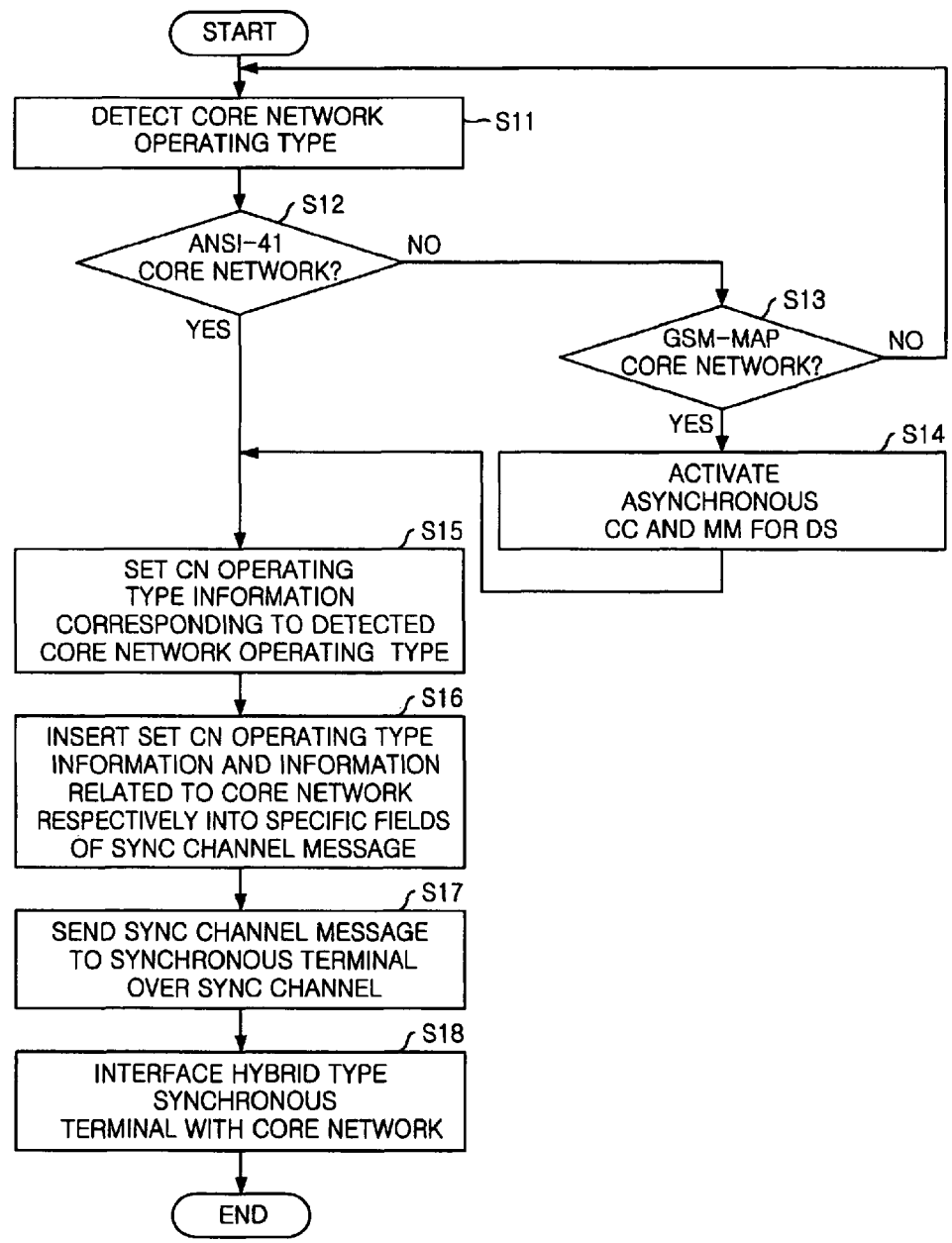
Figure 11B:
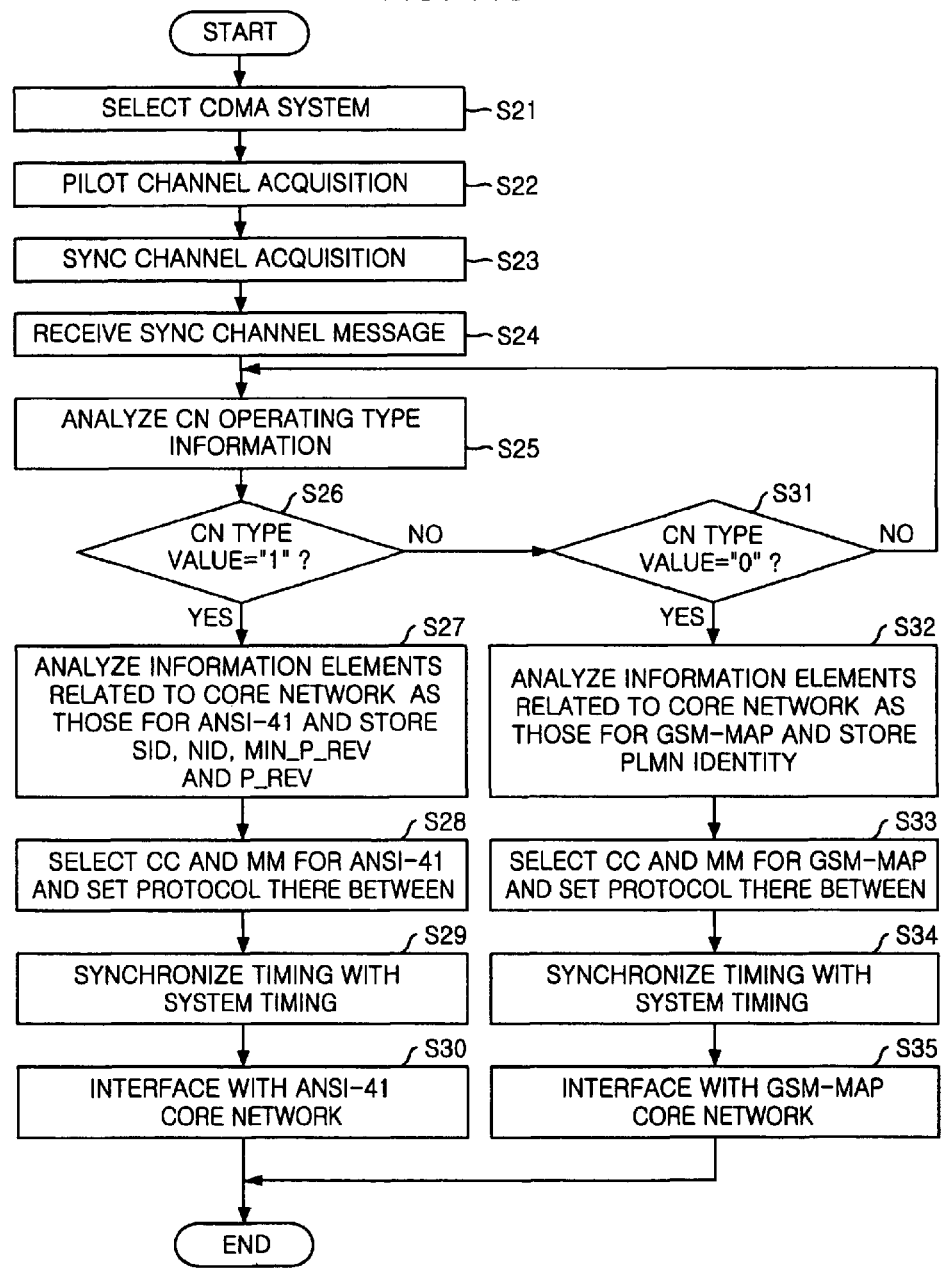

FIG. 11A and FIG. 11B show a method for interfacing a hybrid type synchronous terminal with a core network in accordance with the present invention.

FIG. 11A is a flowchart illustrating a procedure where a hybrid type synchronous radio network including a base transceiver station (BTS) and a base station controller (BSC) determines the operating type of the core network and sends information about the core network, for example, core network operating type information and information related to core network, to the hybrid type synchronous terminal.

First, the BSC in the hybrid type synchronous radio network detects a core network operating type information of a core network connected thereto at step S11.

Noticeably, the BSC detects the core network operating type information of the connected core network on the basis of information from a read only memory (ROM) or information from a dip switch which may be manually operated by an operator, upon system initialization. Alternatively, the BSC may detect the operating type of the connected core network through the exchange of a management/maintenance message with the connected core network.

Further, the BSC may detect the operating type of the connected core network by conducting the above two methods simultaneously or a simple modification of them. Thereafter, the BSC determines at step S12 whether the connected core network is a synchronous ANSI-41 core network. If the connected core network is the synchronous ANSI-41 core network, the BSC sets core network operating type information CN Type corresponding to the detected core network operating type at step S15.

In the case where it is determined at the above step S12 that the connected core network is not the synchronous ANSI-41 core network, the BSC determines at step S13 whether the connected core network is an asynchronous GSM-MAP core network. If the connected core network is the asynchronous GSM-MAP core network, the BSC activates an asynchronous CC part and an asynchronous MM part for a direct spreading (DS) method at step S14 and then sets the CN Type information corresponding to the detected core network operating type at step S15.

Herein, the CN Type information is set to "1" when the connected core network is the synchronous ANSI-41 core network, and "0" when the connected core network is the asynchronous GSM-MAP core network.

Subsequently, the BSC inserts the set core network operating type information and the information related to core network respectively into specific fields of a Sync channel message at step S16.

Herein, the Sync channel message has formats as shown in FIGS. 9A and 9B.

FIG. 9A is a view showing a format of the Sync channel message when the core network connected to the hybrid type synchronous radio network is the GSM-MAP network. As shown in this drawing, the core network operating type information CN Type of "0" or "1" is written in a first field of the Sync channel message and information elements related to the GSM-MAP network, PLMN identity information PLMN_ID, CN domain identity information and NAS system information are sequentially written in the subsequent fields of the message. As described above, the same information elements as those in the conventional Sync channel message shown in FIG. 7A are sequentially written from the next field of the present Sync channel message.

FIG. 9B is a view showing a format of the Sync channel message when the core network connected to the hybrid type synchronous radio work is the ANSI-41 network. As shown in this drawing, the core network operating type information CN Type of "0" or "1" is written in a first field of the Sync channel message and information elements related to the ANSI-41 network, an 8 bits protocol revision level, an 8 bits minimum protocol revision level, a 15 bits system identification and a 16 bits network identification, are sequentially written in the subsequent fields of the message. The same information elements as those in the conventional Sync channel message shown in FIG. 7A are sequentially written from the next field of the present Sync channel message.

Herein, the core network operating type information is used to indicate whether the core network connected to the synchronous radio network is the ANSI-41 network or the GSM-MAP network. For example, the core network operating type information is set to "1" when the core network connected to the hybrid type synchronous radio network is the ANSI-41 core network, and "0" when the connected core network is the GSM-MAP core network. Thereafter, the BSC in the hybrid type synchronous radio network sends the Sync channel message having the CN operating type information to the hybrid type synchronous terminal over a Sync channel at step S17.

Then, the BSC interfaces the hybrid type synchronous terminal with the core network in a synchronous or asynchronous communication manner according to a set protocol at step S18.

On the other hand, upon receiving the above Sync channel message, the hybrid type synchronous terminal synchronizes its timing with that of the connected core network according to a flowchart of FIG. 11B.

That is, upon being powered on, the synchronous terminal selects a CDMA system on the basis of a CDMA channel number, a CDMA area list, an SID list, an NID list and other information stored in its memory and a CDMA system selection algorithm provided from a terminal manufacturer at step S21.

Then, the hybrid type synchronous terminal acquires a pilot having the same. CDMA channel number as that of the selected CDMA system at step S22. In other words, after selecting the CDMA system, the hybrid type synchronous terminal acquires a pilot having the same CDMA channel number as that of the selected CDMA system, or CDMA frequency number as that corresponding to the selected CDMA system.

After acquiring the pilot, the hybrid type synchronous terminal proceeds to step S23 to perform a Sync channel acquisition operation and then to step S24 to receive a Sync channel message over the acquired Sync channel.

Subsequently, the hybrid type synchronous terminal analyzes core network operating type information CN Type among information elements in the received Sync channel message at step S25. Herein, the CN Type information is set to "1" when the connected core network is the synchronous ANSI-41 core network, and "0" when the connected core network is the asynchronous GSM-MAP core network.

Accordingly, the hybrid type synchronous terminal determines at step 526 whether the CN Type information value is "1" and proceeds to step S27 if the CN Type information value is "1". At step S27, the synchronous terminal analyzes information elements related to the core network as those for the ANSI-41 core network and stores desired ones of them in its memory. At this time, the stored information elements are system identification (SID), network identification (NID), a minimum protocol revision level (MIN_P_REV) and a protocol revision level (P_REV).

Thereafter, at step S28, the hybrid type synchronous terminal selects a synchronous CC part and a synchronous MM part for the ANSI-41 network and sets protocols according to the selected operating type. Subsequently, the hybrid type synchronous terminal synchronizes its timing with that of a base transceiver station in the selected system at step S29 and then performs a message interfacing operation with the ANSI-41 core network at step S30.

On the other hand, in the case where it is determined at the above step S26 that the CN Type information value is not "1", the synchronous terminal determines at step S31 whether the CN Type information value is "0" and proceeds to step S32 if the CN Type information value is "0". At step S32, the synchronous terminal analyzes the information elements related to core network as those for the GSM-MAP core network and stores a desired one, a PLMN identity, of them in its memory.

Thereafter, at step S33, the hybrid type synchronous terminal selects an asynchronous CC part and an asynchronous MM part for the GSM-MAP network and sets protocols according to the selected operating type. Subsequently, the hybrid type synchronous terminal synchronizes its timing with that of a base transceiver station in the selected system at step S34 and then performs a message interfacing operation with the GSM-MAP core network at step S35.

<Embodiment 2>

Architectures of telecommunication system for interfacing a hybrid type asynchronous terminal with a core network are described above with reference to FIGS. 4C and 4D and the associated layered protocol structures of the telecommunication system are described above with reference to FIGS. 5C and 5D.

As described above, the method or the apparatus for interfacing in accordance with the present invention adaptively sets a protocol on the basis of an operating type of the core network and smoothly interfaces among the terminal, the base station and the core network. Preferred formats of messages communicated between the terminal and the base station in order to perform setting and interfacing functions are illustrated in FIGS. 10A to and 10D.

FIGS. 10A and 10B show a format of a master information block in a system information message received by a hybrid type asynchronous terminal when a core network connected to a universal mobile telecommunication system (UMTS) terrestrial radio access. network (UTRAN) is an asynchronous GSM-MAP core network. FIGS. 10C and 10D show a format of a master information block in a system information message received by a hybrid type asynchronous terminal when a core network connected to the UTRAN is a synchronous ANSI-41 core network.

If the core network operating type information is ANSI-41 information representing a synchronous core network, the information related to core network includes a revision level (P_REV) representing a revision level of a system protocol, a minimum revision level (M P_REV), a system identification (SID) and network identification (NID). If the core network operating type information is GSM-MAP information representing an asynchronous core network, the information related to core network includes public land mobile network identity (PLMN_ID).

FIG. 12A is a flowchart illustrating a procedure where a hybrid type radio network controller (RNC) in an asynchronous radio network, or UTRAN, determines the operating type of a core network connected thereto and sends the core network operating type information and information related to the core network to a hybrid type asynchronous terminal.

First, the hybrid type RNC in the UTRAN detects an operating type of a core network connected thereto at step S41.

Noticeably, the hybrid type RNC detects the operating type of the connected core network on the basis of information from a read only memory (ROM) or information from a dip switch which may be manually operated by an operator, upon system initialization. Alternatively, the hybrid type RNC may detect the operating type of the connected core network through the exchange of a management/maintenance message with the connected core network. Alternatively, the hybrid type RNC may detect the operating type of the connected core network by conducting the above two methods simultaneously or a simple modification of them.

Thereafter, the hybrid type RNC determines at step S42 whether the connected core network is an asynchronous GSM-MAP core network.

If it is determined at the above step S42 that the connected core network is the asynchronous GSM-MAP core network, the hybrid type RNC sets core network operating type information CN Type corresponding to the detected operating type of the core network at step S45. For example, if the connected core network is the asynchronous GSM-MAP core network, the RNC sets the core network operating type information as "GSM-MAP".

Subsequently, the hybrid type RNC inserts the set CN Type information and information related to core network respectively into specific fields of a system information message at step S46.

Herein, the CN Type information and information related to core network are inserted into a master information block (MIB) in the system information message. In FIGS. 10A and 10B, views showing a format of the MIB are shown. The MIB has the CN Type information and the information related to core network in accordance with the present invention.

In FIGS. 10A and 10B, other fields except for CN information elements are the same as those in the conventional system information message shown in FIG. 7B and a detailed description thereof will thus be omitted. The core network operating information and the information related to core network are written in the CN information element field. Because it is determined at the above step S42 that the connected core network is the asynchronous GSM-MAP core network, "GSM-MAP" is written in the CN Type information field and a PLMN identity is written in the core network related information field.

Thereafter, the RNC sends the system information message having a master information block (MIB) to the hybrid type asynchronous terminal over a BCCH at step S47 and then performs a message interfacing operation between the hybrid type asynchronous terminal and the core network at step S48.

On the other hand, in the case where it is determined at the above step S42 that the connected core network is not the asynchronous GSM-MAP core network, the RNC determines at step S43 whether the connected core network is a synchronous ANSI-41 core network. If the connected core network is the synchronous ANSI-41 core network, the RNC activates a synchronous. CC part and a synchronous MM part for MC at step S44 and then sets the core network operating type information CN Type corresponding to the detected core network operating type at step S45. For example, if the connected core network is the synchronous ANSI-41 core network, the RNC sets the CN Type information as "ANSI-41"

Subsequently, the RNC inserts the set CN Type information and the information related to core network respectively into specific fields of a system information message at step S46.

Herein, the CN Type information and the information related to core network are inserted into the MIB in the system information message. FIGS. 10C and 10D are views showing a format of the MIB in which the CN Type information and information related to core network are written in accordance with the present invention.

In FIGS. 10C and 10D, other fields except for fields containing CN information elements are the same as those in the conventional system information message shown in FIG. 7B and a detailed description thereof will thus be omitted. The CN Type information and information related to core network are written in the CN information element fields. Because it is determined at the above step S43 that the connected core network is the synchronous ANSI-41 core network, "ANSI-41" is written in the CN Type information field and ANSI-41 information elements are written in the information related to core network field. Herein, the ANSI-41 information elements are P_REV, MIN_P_REV, SID and NID information. Thereafter, the RNC sends the system information message having the MIB to the asynchronous terminal over the BCCH at step S47 and then performs a message interfacing operation between the hybrid type asynchronous terminal and the core network at step S48.

On the other hand, upon receiving the above system information message over the BCCH, the hybrid type asynchronous terminal sets its protocol through a procedure of FIG. 12B to perform an interfacing operation with the core network.

Namely, upon being powered on, the hybrid type asynchronous terminal selects a PLMN where it is located, on the basis of a PLMN list stored in its memory at step S51. Then, the hybrid type asynchronous terminal selects a cell in the selected PLMN with which it can efficiently communicate, at step S52, and receives a system information message as shown in FIGS. 10A and 10B or 10C and 10D over a BCCH at step S53.

At step S54, the hybrid type asynchronous terminal extracts the master information block (MIB) from the received system information message and analyzes CN Type information in the extracted MIB.

The hybrid type asynchronous terminal determines at step S55 whether the CN Type information is "GSM-MAP" and proceeds to step S56 if the CN Type information is "GSM-MAP". At step S56, the hybrid type asynchronous terminal analyzes the information elements related to core network as those for the GSM-MAP core network and stores a desired one, a PLMN identity, of them in its memory.

Thereafter, at step S57, the asynchronous terminal selects an asynchronous CC part and an asynchronous MM part for the GSM-MAP network and sets a protocol therebetween. Subsequently, the hybrid type asynchronous terminal carries out its initialization based on the contents of the information elements related to core network at step S58 and then performs a message interfacing operation with the GSM-MAP core network at step S59.

On the other hand, in the case where it is determined at the above step S55 that the CN Type information is not "GSM-MAP", the hybrid type asynchronous terminal determines at step S60 whether the CN Type information is "ANSI-41" and proceeds to step S61 if the CN Type information is "ANSI-41".

At step S61, the hybrid type asynchronous terminal analyzes the information elements related to the core network as those for the ANSI-41 core network and stores desired ones of them in its memory. The stored information elements are SID, NID, MIN_P_REV and P_REV information.

Thereafter, at step S62, the hybrid type asynchronous terminal selects a synchronous CC part and a synchronous MM part for the ANSI-41 network and sets a protocol therebetween. Subsequently, the hybrid type asynchronous terminal carries out its initialization based on the contents of the core network related information elements at step S63 and then performs a message interfacing operation with the ANSI-41 core network at step S64.

As apparent from the above description, according to the present invention, even though a hybrid type synchronous or asynchronous terminal is connected to either a GSM-MAP core network or an ANSI-41 core network, it can smoothly be interfaced with the connected core network because it is able to recognize the operating type of the connected core network and information related to the core network.

Further, new information elements (CN Type information and information related to core network) are simply added to a Sync channel message used in an existing synchronous radio network, in other words, changes or modifications of existing information elements in the Sync channel message are minimized. Therefore, the hybrid type synchronous radio network can readily notify a hybrid type synchronous terminal of the operating type of a connected core network, and a synchronous system subscriber can be provided with a service from an asynchronous GSM-MAP core network.

Moreover, new information elements, i.e., CN Type information and information related to core network, are added to a system information message used in an asynchronous system having an existing asynchronous radio network, without modifying existing information elements in the system information message. Therefore, the hybrid type asynchronous radio network can readily notify a hybrid type asynchronous terminal of the operating type of a connected core network, and an asynchronous system subscriber can be provided with a service from a synchronous ANSI-41 core network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for interfacing between a terminal and a radio network, comprising:
   providing the terminal with a message comprising an information element identifying an operating type of a core network,
   wherein the operating type of the core network comprises global system for mobile communications application part (GSM-MAP), and
   wherein the message further comprises core network information elements in a master information block, the core network information elements identifying a Public Land Mobile Network depending upon the value of the information element identifying the operating type of the core network.

2. A method for interfacing between a terminal and a radio network, comprising:
   providing the terminal with a message comprising an information element identifying an operating type of a core network,
   wherein the operating type of the core network comprises ANSI-41, and
   wherein the message further comprises core network information elements in a master information block, the values of the core network information elements depending upon the value of the information element identifying the operating type of the core network.

3. An apparatus for interfacing between a terminal and a radio network, comprising:
   a storage device for storing core network operating type information representing an operating type of a core network;
   an extraction block for reading the core network operating type information during a time period of initialization of the radio network; and
   a messaging block for periodically providing the terminal with a message comprising an information element identifying the operating type of the core network,
   wherein the operating type of the core network comprises global system for mobile communications application part (GSM-MAP), and
   wherein the message further comprises core network information elements in a master information block, the core network information elements identifying a Public Land Mobile Network depending upon the value of the information element identifying the operating type of the core network.

4. An apparatus for interfacing between a terminal and a radio network, comprising:
   a storage device for storing core network operating type information representing an operating type of a core network;
   an extraction block for reading the core network operating type information during a time period of initialization of the radio network; and
   a messaging block for periodically providing the terminal with a message comprising an information element identifying the operating type of the core network,
   wherein the operating type of the core network comprises ANSI-41, and
   wherein the message further comprises core network information elements in a master information block, the values of the core network information elements depending upon the value of the information element identifying the operating type of the core network.

5. A method for interfacing between a terminal and a radio network connected to a core network, wherein the core network is an ANSI-41 AND GSM-MAP operating type, comprising:
   providing the terminal with a message comprising an information element identifying the operating type of the core network,
   wherein the message further comprises core network information elements in a master information block, the core network information elements identifying a Public Land Mobile Network depending upon the value of the information element identifying the operating type of the core network.

6. An apparatus for interfacing between a terminal and a radio network connected to a core network, wherein the core network is an ANSI-41 AND GSM-MAP operating type, said apparatus comprising:
   a storage device for storing core network operating type information representing an operating type of a core network;
   an extraction block for reading the core network operating type information during a time period of initialization of the radio network; and a messaging block for providing the terminal with a message comprising an information element identifying the operating type of the core network, wherein the message further comprises core network information elements in a master information block, the core network information elements identifying a Public Land Mobile Network depending upon the value of the information element identifying the operating type of the core network.

7. A method for interfacing between a terminal and a radio network connected to a core network, wherein the core network is a GSM-MAP operating type, comprising:

providing the terminal with a message comprising an information element identifying the operating type of the core network, wherein the message further comprises core network information elements in a master information block, the core network information elements identifying a Public Land Mobile Network depending upon the value of the information element identifying the operating type of the core network.

8. An apparatus for interfacing between a terminal and a radio network connected to a core network, wherein the core network is a GSM-MAP operating type, comprising:

a storage device for storing core network operating type information representing an operating type of a core network;

an extraction block for reading the core network operating type information during a time period of initialization of the radio network; and a messaging block for providing the terminal with a message comprising an information element identifying the operating type of the core network, wherein the message further comprises core network information elements in a master information block, the core network information elements identifying a Public Land Mobile Network depending upon the value of the information element identifying the operating type of the core network.

9. A method for interfacing between a terminal and a radio network, comprising:

providing the terminal with a message comprising an information element identifying an operating type of a core network, wherein the message further comprises:

'PLMN IDENTITY' information elements identifying a Public Land Mobile Network (PLMN) for a GSM-MAP type of PLMN, and wherein the operating type of the core network comprises global system for mobile communications application part (GSM-MAP), and wherein the message further comprises scheduling information and a Master Information Block (MIB) value tag.

10. An apparatus for interfacing between a terminal and a radio network, comprising:

a storage device for storing core network operating type information representing an operating type of a core network;

an extraction block for reading the core network operating type information during a time period of initialization of the radio network; and a messaging block for periodically providing the terminal with a message comprising an information element identifying the operating type of the core network, wherein the message further comprises:

'PLMN IDENTITY' information elements identifying a Public Land Mobile Network (PLMN) for a GSM-MAP type of PLMN, wherein the operating type of the core network comprises global system for mobile communications application part (GSM-MAP).

11. The apparatus as recited in claim 10, wherein the message further comprises scheduling information and a Master Information Block (MIB) value tag.

12. An apparatus for interfacing between a terminal and a radio network, wherein the terminal has an asynchronous operating type, comprising:

a storage device for storing core network operating type information representing an operating type of a core network;

an extraction block for reading the core network operating type information during a time period of initialization of the radio network; and a messaging block for periodically providing the terminal with a message comprising an information element identifying the operating type of the core network through a predetermined channel, wherein the message further comprises:

'PLMN IDENTITY' information elements identifying a Public Land Mobile Network (PLMN) for a GSM-MAP type of PLMN, wherein the operating type of the core network comprises global system for mobile communications application part (GSM-MAP).

13. The apparatus as recited in claim 12, wherein the message further comprises scheduling information and a Master Information Block (MIB) value tag.

* * * * *